United States Patent
LeVee et al.

(10) Patent No.: US 9,223,472 B2
(45) Date of Patent: Dec. 29, 2015

(54) CLOSING APPLICATIONS

(75) Inventors: Brian S. LeVee, Seattle, WA (US); Jan-Kristian Markiewicz, Redmond, WA (US); Gerrit H. Hofmeester, Woodinville, WA (US); Nils A. Sundelin, Bothell, WA (US); Chaitanya Dev Sareen, Seattle, WA (US); Matthew I. Worley, Bellevue, WA (US); Jesse Clay Satterfield, Seattle, WA (US); Adam E. Barrus, Redmond, WA (US); Benjamin Salim Srour, Seattle, WA (US); Bret P. Anderson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 13/335,001

(22) Filed: Dec. 22, 2011

(65) Prior Publication Data

US 2013/0167058 A1 Jun. 27, 2013

(51) Int. Cl.
*G06F 3/0481* (2013.01)
*G06F 3/0482* (2013.01)
*G06F 3/0486* (2013.01)
*G06F 9/44* (2006.01)
*G06Q 50/00* (2012.01)

(52) U.S. Cl.
CPC ............ *G06F 3/0482* (2013.01); *G06F 3/0481* (2013.01); *G06F 3/0486* (2013.01); *G06F 9/4443* (2013.01); *G06F 2203/04803* (2013.01); *G06Q 50/01* (2013.01)

(58) Field of Classification Search
CPC .......................... G06F 3/048; G06F 3/00–3/05
USPC .......................... 715/764, 767, 768, 779, 864
See application file for complete search history.

(56) References Cited

U.S. PATENT DOCUMENTS

| 4,823,283 | A | 4/1989 | Diehm et al. |
| 5,045,997 | A | 9/1991 | Watanabe |
| 5,046,001 | A | 9/1991 | Barker et al. |

(Continued)

FOREIGN PATENT DOCUMENTS

| CN | 1512301 | 7/2004 |
| CN | 1735856 | 2/2006 |

(Continued)

OTHER PUBLICATIONS

Guiding Tech, CloseAll Closes All Open Program Windows in One Click, online tech blog, from http://www.guidingtech.com/2470/close-open-program-windows-in-one-click/, retrieved archive version of Apr. 24, 2010 from wayback machine (http://archive.org/web/web.php).*
"Daphne v1.47", Retrieved at <<http://www.drk.com.ar/daphne.php>>, Retrieved Date: Sep. 18, 2011, pp. 3.
"TaskOS", Retrieved at <<http://www.appbrain.com/app/taskos/com.profete162.TaskOS>>, Retrieved Date: Sep. 18, 2011, pp. 2.
"SeaMonkey Hangs during Drag Operation", Retrieved at <<http://forums.mozillazine.org/viewtopic.php?f=5&t=1783735>>, Retrieved Date: Sep. 18, 2011, pp. 2.
"Better Way to Delete and Close Apps from Task Manager", Retrieved at <<http://www.ideasproject.com/ideas/14475>>, Retrieved Date: Sep. 21, 2011, pp. 2.

(Continued)

*Primary Examiner* — Tadeese Hailu
*Assistant Examiner* — Shangao Zhang
(74) *Attorney, Agent, or Firm* — Bryan Webster; Judy Yee; Micky Minhas

(57) ABSTRACT

Application closing techniques are described. In one or more implementations, a computing device recognizes an input as involving selection of an application displayed in a display environment by the computing device and subsequent movement of a point of the selection toward an edge of the display environment. Responsive to the recognizing of the input, the selected application is closed by the computing device.

19 Claims, 13 Drawing Sheets

(56) References Cited

U.S. PATENT DOCUMENTS

| | | |
|---|---|---|
| 5,189,732 A | 2/1993 | Kondo |
| 5,258,748 A | 11/1993 | Jones |
| 5,297,032 A | 3/1994 | Trojan et al. |
| 5,321,750 A | 6/1994 | Nadan |
| 5,339,392 A | 8/1994 | Risberg et al. |
| 5,406,307 A | 4/1995 | Hirayama et al. |
| 5,432,932 A | 7/1995 | Chen et al. |
| 5,463,725 A | 10/1995 | Henckel et al. |
| 5,485,197 A | 1/1996 | Hoarty |
| 5,487,143 A | 1/1996 | Southgate |
| 5,495,566 A | 2/1996 | Kwatinetz |
| 5,515,495 A | 5/1996 | Ikemoto |
| 5,574,836 A | 11/1996 | Broemmelsiek |
| 5,598,523 A | 1/1997 | Fujita |
| 5,603,053 A | 2/1997 | Gough et al. |
| 5,611,060 A | 3/1997 | Belfiore et al. |
| 5,623,613 A | 4/1997 | Rowe et al. |
| 5,640,176 A | 6/1997 | Mundt et al. |
| 5,650,827 A | 7/1997 | Tsumori et al. |
| 5,657,049 A | 8/1997 | Ludolph et al. |
| 5,675,329 A | 10/1997 | Barker |
| 5,687,331 A | 11/1997 | Volk et al. |
| 5,712,995 A | 1/1998 | Cohn |
| 5,771,042 A | 6/1998 | Santos-Gomez |
| 5,793,415 A | 8/1998 | Gregory et al. |
| 5,819,284 A | 10/1998 | Farber et al. |
| 5,844,547 A | 12/1998 | Minakuchi et al. |
| 5,859,636 A | 1/1999 | Pandit |
| 5,860,073 A | 1/1999 | Ferrel et al. |
| 5,889,517 A | 3/1999 | Ueda et al. |
| 5,905,492 A | 5/1999 | Straub et al. |
| 5,914,720 A | 6/1999 | Maples et al. |
| 5,940,076 A | 8/1999 | Sommers et al. |
| 5,959,621 A | 9/1999 | Nawaz et al. |
| 5,963,204 A | 10/1999 | Ikeda et al. |
| 6,008,809 A | 12/1999 | Brooks |
| 6,008,816 A | 12/1999 | Eisler |
| 6,009,519 A | 12/1999 | Jones et al. |
| 6,011,542 A | 1/2000 | Durrani et al. |
| 6,028,600 A | 2/2000 | Rosin et al. |
| 6,057,839 A | 5/2000 | Advani et al. |
| 6,064,383 A | 5/2000 | Skelly |
| 6,104,418 A | 8/2000 | Tanaka et al. |
| 6,108,003 A | 8/2000 | Hall, Jr. et al. |
| 6,111,585 A | 8/2000 | Choi |
| 6,115,040 A | 9/2000 | Bladow et al. |
| 6,166,736 A | 12/2000 | Hugh |
| 6,188,405 B1 | 2/2001 | Czerwinski et al. |
| 6,211,921 B1 | 4/2001 | Cherian et al. |
| 6,212,564 B1 | 4/2001 | Harter et al. |
| 6,216,141 B1 | 4/2001 | Straub et al. |
| 6,266,098 B1 | 7/2001 | Cove et al. |
| 6,278,448 B1 | 8/2001 | Brown et al. |
| 6,281,940 B1 | 8/2001 | Sciammarella |
| 6,311,058 B1 | 10/2001 | Wecker et al. |
| 6,346,935 B1 | 2/2002 | Nakajima et al. |
| 6,369,837 B1 | 4/2002 | Schirmer |
| 6,385,630 B1 | 5/2002 | Ejerhed |
| 6,396,963 B2 | 5/2002 | Shaffer |
| 6,411,307 B1 | 6/2002 | Rosin et al. |
| 6,424,338 B1 | 7/2002 | Andersone |
| 6,426,753 B1 | 7/2002 | Migdal |
| 6,433,789 B1 | 8/2002 | Rosman |
| 6,448,987 B1 | 9/2002 | Easty et al. |
| 6,449,638 B1 | 9/2002 | Wecker et al. |
| 6,456,334 B1 | 9/2002 | Duhault |
| 6,489,977 B2 | 12/2002 | Sone |
| 6,505,243 B1 | 1/2003 | Lortz |
| 6,507,643 B1 | 1/2003 | Groner |
| 6,510,144 B1 | 1/2003 | Dommety et al. |
| 6,510,466 B1 | 1/2003 | Cox et al. |
| 6,510,553 B1 | 1/2003 | Hazra |
| 6,538,635 B1 | 3/2003 | Ringot |
| 6,570,582 B1 | 5/2003 | Sciammarella et al. |
| 6,570,597 B1 | 5/2003 | Seki et al. |
| 6,577,323 B1 | 6/2003 | Jamieson et al. |
| 6,577,350 B1 | 6/2003 | Proehl et al. |
| 6,591,244 B2 | 7/2003 | Jim et al. |
| 6,597,374 B1 | 7/2003 | Baker et al. |
| 6,628,309 B1 | 9/2003 | Dodson et al. |
| 6,636,246 B1 | 10/2003 | Gallo et al. |
| 6,662,023 B1 | 12/2003 | Helle |
| 6,690,387 B2 | 2/2004 | Zimmerman et al. |
| 6,697,825 B1 | 2/2004 | Underwood et al. |
| 6,707,449 B2 | 3/2004 | Hinckley et al. |
| 6,710,771 B1 | 3/2004 | Yamaguchi et al. |
| 6,721,958 B1 | 4/2004 | Dureau |
| 6,724,403 B1 | 4/2004 | Santoro et al. |
| 6,784,925 B1 | 8/2004 | Tomat et al. |
| 6,798,421 B2 | 9/2004 | Baldwin |
| 6,801,203 B1 | 10/2004 | Hussain |
| 6,807,558 B1 | 10/2004 | Hassett et al. |
| 6,832,355 B1 | 12/2004 | Duperrouzel et al. |
| 6,857,104 B1 | 2/2005 | Cahn |
| 6,865,297 B2 | 3/2005 | Loui |
| 6,873,329 B2 | 3/2005 | Cohen et al. |
| 6,876,312 B2 | 4/2005 | Yu |
| 6,885,974 B2 | 4/2005 | Holle |
| 6,904,597 B2 | 6/2005 | Jin |
| 6,920,445 B2 | 7/2005 | Bae |
| 6,938,101 B2 | 8/2005 | Hayes et al. |
| 6,961,731 B2 | 11/2005 | Holbrook |
| 6,971,067 B1 | 11/2005 | Karson et al. |
| 6,972,776 B2 | 12/2005 | Davis et al. |
| 6,975,306 B2 | 12/2005 | Hinckley |
| 6,976,210 B1 | 12/2005 | Silva et al. |
| 6,978,303 B1 | 12/2005 | McCreesh et al. |
| 6,983,310 B2 | 1/2006 | Rouse |
| 6,987,991 B2 | 1/2006 | Nelson |
| 7,013,041 B2 | 3/2006 | Miyamoto |
| 7,017,119 B1 | 3/2006 | Johnston et al. |
| 7,019,757 B2 | 3/2006 | Brown et al. |
| 7,028,264 B2 | 4/2006 | Santoro et al. |
| 7,032,187 B2 | 4/2006 | Keely, Jr. et al. |
| 7,036,090 B1 | 4/2006 | Nguyen |
| 7,036,091 B1 | 4/2006 | Nguyen |
| 7,042,460 B2 | 5/2006 | Hussain et al. |
| 7,051,291 B2 | 5/2006 | Sciammarella et al. |
| 7,058,955 B2 | 6/2006 | Porkka |
| 7,065,385 B2 | 6/2006 | Jarrad et al. |
| 7,065,386 B1 | 6/2006 | Smethers |
| 7,075,535 B2 | 7/2006 | Aguera y Arcas |
| 7,089,507 B2 | 8/2006 | Lection et al. |
| 7,091,998 B2 | 8/2006 | Miller-Smith |
| 7,093,201 B2 | 8/2006 | Duarte |
| 7,106,349 B2 | 9/2006 | Baar et al. |
| 7,111,044 B2 | 9/2006 | Lee |
| 7,133,707 B1 | 11/2006 | Rak |
| 7,133,859 B1 | 11/2006 | Wong |
| 7,139,800 B2 | 11/2006 | Bellotti et al. |
| 7,146,573 B2 | 12/2006 | Brown et al. |
| 7,155,729 B1 | 12/2006 | Andrew et al. |
| 7,158,123 B2 | 1/2007 | Myers et al. |
| 7,158,135 B2 | 1/2007 | Santodomingo et al. |
| 7,178,111 B2 | 2/2007 | Glein et al. |
| 7,197,702 B2 | 3/2007 | Niyogi et al. |
| 7,210,099 B2 | 4/2007 | Rohrabaugh et al. |
| 7,216,588 B2 | 5/2007 | Suess |
| 7,249,326 B2 | 7/2007 | Stoakley et al. |
| 7,251,782 B1 | 7/2007 | Albers |
| 7,262,775 B2 | 8/2007 | Calkins et al. |
| 7,263,668 B1 | 8/2007 | Lentz |
| 7,280,097 B2 | 10/2007 | Chen |
| 7,283,620 B2 | 10/2007 | Adamczyk |
| 7,289,806 B2 | 10/2007 | Morris et al. |
| 7,296,184 B2 | 11/2007 | Derks et al. |
| 7,296,242 B2 | 11/2007 | Agata et al. |
| 7,304,638 B2 | 12/2007 | Murphy |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,343,567 B2 | 3/2008 | Mann et al. |
| 7,369,647 B2 | 5/2008 | Gao et al. |

(56) References Cited

U.S. PATENT DOCUMENTS

| | | |
|---|---|---|
| 7,376,907 B2 | 5/2008 | Santoro et al. |
| 7,386,807 B2 | 6/2008 | Cummins et al. |
| 7,388,578 B2 | 6/2008 | Tao |
| 7,403,191 B2 | 7/2008 | Sinclair |
| 7,408,538 B2 | 8/2008 | Hinckley et al. |
| 7,412,663 B2 | 8/2008 | Lindsay et al. |
| 7,433,920 B2 | 10/2008 | Blagsvedt et al. |
| 7,447,520 B2 | 11/2008 | Scott |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,484,182 B1 | 1/2009 | Smith |
| 7,487,467 B1 | 2/2009 | Kawahara et al. |
| 7,496,830 B2 | 2/2009 | Rubin |
| 7,512,966 B2 | 3/2009 | Lyons, Jr. et al. |
| 7,577,918 B2 | 8/2009 | Lindsay |
| 7,581,034 B2 | 8/2009 | Polivy et al. |
| 7,593,995 B1 | 9/2009 | He et al. |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,096 B2 | 10/2009 | Oreizy et al. |
| 7,607,106 B2 | 10/2009 | Ernst et al. |
| 7,610,563 B2 | 10/2009 | Nelson et al. |
| 7,614,018 B1 | 11/2009 | Ohazama et al. |
| 7,619,615 B1 | 11/2009 | Donoghue |
| 7,640,518 B2 | 12/2009 | Forlines et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,671,756 B2 | 3/2010 | Herz et al. |
| 7,681,138 B2 | 3/2010 | Grasser et al. |
| 7,702,683 B1 | 4/2010 | Kirshenbaum |
| 7,730,425 B2 | 6/2010 | de los Reyes et al. |
| 7,746,388 B2 | 6/2010 | Jeon |
| 7,755,674 B2 | 7/2010 | Kaminaga |
| 7,765,490 B2 | 7/2010 | Lai et al. |
| 7,834,861 B2 | 11/2010 | Lee |
| 7,840,979 B2 | 11/2010 | Poling et al. |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,898,529 B2 | 3/2011 | Fitzmaurice et al. |
| 7,924,271 B2 | 4/2011 | Christie et al. |
| 7,933,632 B2 | 4/2011 | Flynt et al. |
| 7,962,281 B2 | 6/2011 | Rasmussen et al. |
| 7,983,718 B1 | 7/2011 | Roka |
| 7,987,431 B2 | 7/2011 | Santoro et al. |
| 8,006,276 B2 | 8/2011 | Nakagawa et al. |
| 8,065,628 B2 | 11/2011 | Oshiro et al. |
| 8,086,275 B2 | 12/2011 | Wykes |
| 8,108,781 B2 | 1/2012 | Laansoo et al. |
| 8,131,808 B2 | 3/2012 | Aoki et al. |
| 8,134,727 B1 | 3/2012 | Shmunis et al. |
| 8,150,924 B2 | 4/2012 | Buchheit et al. |
| 8,175,653 B2 | 5/2012 | Smuga |
| 8,176,438 B2 | 5/2012 | Zaman et al. |
| 8,190,707 B2 | 5/2012 | Trivedi et al. |
| 8,209,623 B2 | 6/2012 | Barletta et al. |
| 8,225,193 B1 | 7/2012 | Kleinschnitz et al. |
| 8,238,876 B2 | 8/2012 | Teng |
| 8,245,152 B2 | 8/2012 | Brunner et al. |
| 8,245,156 B2 | 8/2012 | Mouilleseaux et al. |
| 8,250,494 B2 | 8/2012 | Butcher |
| 8,255,473 B2 | 8/2012 | Eren et al. |
| 8,255,812 B1 | 8/2012 | Parparita et al. |
| 8,255,818 B2 | 8/2012 | Bales et al. |
| 8,269,736 B2 | 9/2012 | Wilairat |
| 8,280,901 B2 | 10/2012 | McDonald |
| 8,289,688 B2 | 10/2012 | Behar et al. |
| 8,312,383 B2 | 11/2012 | Gilfix |
| 8,334,871 B2 | 12/2012 | Hamilton et al. |
| 8,355,698 B2 | 1/2013 | Teng et al. |
| 8,385,952 B2 | 2/2013 | Friedman et al. |
| 8,411,046 B2 | 4/2013 | Kruzeniski et al. |
| 8,429,565 B2 | 4/2013 | Agarawala et al. |
| 8,448,083 B1 | 5/2013 | Migos et al. |
| 8,473,870 B2 | 6/2013 | Hinckley et al. |
| 8,527,892 B2 | 9/2013 | Sirpal et al. |
| 8,539,384 B2 | 9/2013 | Hinckley et al. |
| 8,548,431 B2 | 10/2013 | Teng et al. |
| 8,549,430 B2 | 10/2013 | Russell et al. |
| 8,560,959 B2 | 10/2013 | Zaman et al. |
| 8,589,815 B2 | 11/2013 | Fong et al. |
| 8,612,874 B2 | 12/2013 | Zaman et al. |
| 8,615,713 B2 | 12/2013 | Sun et al. |
| 8,639,819 B2 | 1/2014 | Pohja et al. |
| 8,687,023 B2 | 4/2014 | Markiewicz et al. |
| 8,689,123 B2 | 4/2014 | Zaman et al. |
| 9,015,606 B2 | 4/2015 | Zaman et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0035607 A1 | 3/2002 | Checkoway |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0091755 A1 | 7/2002 | Narin |
| 2002/0097264 A1 | 7/2002 | Dutta et al. |
| 2002/0105531 A1 | 8/2002 | Niemi |
| 2002/0105553 A1 | 8/2002 | Segre |
| 2002/0115476 A1 | 8/2002 | Padawer et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0152305 A1 | 10/2002 | Jackson et al. |
| 2002/0154176 A1 | 10/2002 | Barksdale et al. |
| 2002/0161634 A1 | 10/2002 | Kaars |
| 2002/0186251 A1 | 12/2002 | Himmel et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihata |
| 2003/0020671 A1 | 1/2003 | Santoro et al. |
| 2003/0040300 A1 | 2/2003 | Bodic |
| 2003/0046396 A1 | 3/2003 | Richter et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2003/0234799 A1 | 12/2003 | Lee |
| 2004/0015553 A1 | 1/2004 | Griffin et al. |
| 2004/0066414 A1 | 4/2004 | Czerwinski et al. |
| 2004/0066418 A1 | 4/2004 | Tosey |
| 2004/0068543 A1 | 4/2004 | Seifert |
| 2004/0078299 A1 | 4/2004 | Down-Logan |
| 2004/0111673 A1 | 6/2004 | Bowman et al. |
| 2004/0155908 A1 | 8/2004 | Wagner |
| 2004/0165010 A1* | 8/2004 | Robertson et al. ............ 345/805 |
| 2004/0185883 A1 | 9/2004 | Rukman |
| 2004/0212586 A1 | 10/2004 | Denny |
| 2004/0212617 A1 | 10/2004 | Fitzmaurice et al. |
| 2004/0217954 A1 | 11/2004 | O'Gorman et al. |
| 2004/0237048 A1 | 11/2004 | Tojo et al. |
| 2004/0250217 A1 | 12/2004 | Tojo et al. |
| 2005/0005241 A1 | 1/2005 | Hunleth et al. |
| 2005/0028208 A1 | 2/2005 | Ellis |
| 2005/0044058 A1 | 2/2005 | Matthews et al. |
| 2005/0054384 A1 | 3/2005 | Pasquale et al. |
| 2005/0060647 A1 | 3/2005 | Doan et al. |
| 2005/0060658 A1 | 3/2005 | Tsukiori |

(56) References Cited

U.S. PATENT DOCUMENTS

| | | |
|---|---|---|
| 2005/0060665 A1 | 3/2005 | Rekimoto |
| 2005/0079896 A1 | 4/2005 | Kokko et al. |
| 2005/0085215 A1 | 4/2005 | Kokko |
| 2005/0085272 A1 | 4/2005 | Anderson et al. |
| 2005/0108655 A1 | 5/2005 | Andrea et al. |
| 2005/0114788 A1 | 5/2005 | Fabritius |
| 2005/0120306 A1 | 6/2005 | Klassen et al. |
| 2005/0125739 A1 | 6/2005 | Thompson et al. |
| 2005/0136953 A1 | 6/2005 | Jo |
| 2005/0143138 A1 | 6/2005 | Lee et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0198584 A1 | 9/2005 | Matthews et al. |
| 2005/0200762 A1 | 9/2005 | Barletta et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0005207 A1 | 1/2006 | Louch et al. |
| 2006/0010394 A1 | 1/2006 | Chaudhri et al. |
| 2006/0015562 A1 | 1/2006 | Kilian-Kehr et al. |
| 2006/0015736 A1 | 1/2006 | Callas et al. |
| 2006/0015812 A1 | 1/2006 | Cunningham |
| 2006/0015820 A1 | 1/2006 | Wood |
| 2006/0026013 A1 | 2/2006 | Kraft |
| 2006/0026521 A1 | 2/2006 | Hotelling et al. |
| 2006/0036425 A1 | 2/2006 | Le Cocq et al. |
| 2006/0048073 A1 | 3/2006 | Jarrett et al. |
| 2006/0048101 A1 | 3/2006 | Krassovsky et al. |
| 2006/0059430 A1 | 3/2006 | Bells |
| 2006/0070005 A1 | 3/2006 | Gilbert et al. |
| 2006/0074735 A1 | 4/2006 | Shukla et al. |
| 2006/0074771 A1 | 4/2006 | Kim |
| 2006/0075360 A1 | 4/2006 | Bixler |
| 2006/0103623 A1 | 5/2006 | Davis |
| 2006/0107231 A1 | 5/2006 | Matthews et al. |
| 2006/0112354 A1 | 5/2006 | Park et al. |
| 2006/0114239 A1 | 6/2006 | Nakajima |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0156247 A1 | 7/2006 | McCormack et al. |
| 2006/0172724 A1 | 8/2006 | Linkert et al. |
| 2006/0173911 A1 | 8/2006 | Levin et al. |
| 2006/0184901 A1 | 8/2006 | Dietz |
| 2006/0190833 A1 | 8/2006 | SanGiovanni et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0224993 A1 | 10/2006 | Wong et al. |
| 2006/0246955 A1 | 11/2006 | Nirhamo |
| 2006/0248471 A1 | 11/2006 | Lindsay et al. |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LaVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen et al. |
| 2007/0035513 A1 | 2/2007 | Sherrard et al. |
| 2007/0038567 A1 | 2/2007 | Allaire et al. |
| 2007/0050724 A1 | 3/2007 | Lee et al. |
| 2007/0054679 A1 | 3/2007 | Cho et al. |
| 2007/0061306 A1 | 3/2007 | Pell et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0067737 A1 | 3/2007 | Zielinski et al. |
| 2007/0067798 A1 | 3/2007 | Wroblewski |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083746 A1 | 4/2007 | Fallon et al. |
| 2007/0083821 A1 | 4/2007 | Garbow et al. |
| 2007/0094597 A1 | 4/2007 | Rostom |
| 2007/0106635 A1 | 5/2007 | Frieden et al. |
| 2007/0120835 A1 | 5/2007 | Sato |
| 2007/0127638 A1 | 6/2007 | Doulton |
| 2007/0136677 A1 | 6/2007 | Agarwal |
| 2007/0150826 A1 | 6/2007 | Anzures et al. |
| 2007/0150842 A1 | 6/2007 | Chaudhri et al. |
| 2007/0157089 A1 | 7/2007 | Van Os et al. |
| 2007/0157099 A1 | 7/2007 | Haug |
| 2007/0171192 A1 | 7/2007 | Seo et al. |
| 2007/0171238 A1 | 7/2007 | Ubillos et al. |
| 2007/0180401 A1 | 8/2007 | Singh et al. |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192730 A1 | 8/2007 | Simila et al. |
| 2007/0192733 A1 | 8/2007 | Horiuchi |
| 2007/0192739 A1 | 8/2007 | Hunleth et al. |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214422 A1 | 9/2007 | Agarwal et al. |
| 2007/0214429 A1 | 9/2007 | Lyudovyk et al. |
| 2007/0214454 A1 | 9/2007 | Edwards et al. |
| 2007/0216651 A1 | 9/2007 | Patel |
| 2007/0216661 A1 | 9/2007 | Chen et al. |
| 2007/0225022 A1 | 9/2007 | Satake |
| 2007/0233654 A1 | 10/2007 | Karlson |
| 2007/0236468 A1 | 10/2007 | Tuli |
| 2007/0238487 A1 | 10/2007 | Kuhl et al. |
| 2007/0238488 A1 | 10/2007 | Scott |
| 2007/0247435 A1 | 10/2007 | Benko et al. |
| 2007/0250583 A1 | 10/2007 | Hardy |
| 2007/0250787 A1 | 10/2007 | Kawahara et al. |
| 2007/0253758 A1 | 11/2007 | Suess |
| 2007/0255831 A1 | 11/2007 | Hayashi et al. |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0273668 A1 | 11/2007 | Park et al. |
| 2007/0280457 A1 | 12/2007 | Aberethy |
| 2007/0281747 A1 | 12/2007 | Pletikosa |
| 2007/0291007 A1 | 12/2007 | Forlines et al. |
| 2008/0005668 A1 | 1/2008 | Mavinkurve |
| 2008/0028294 A1 | 1/2008 | Sell et al. |
| 2008/0032681 A1 | 2/2008 | West |
| 2008/0036743 A1 | 2/2008 | Westerman |
| 2008/0040692 A1 | 2/2008 | Sunday et al. |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0059896 A1 | 3/2008 | Anderson et al. |
| 2008/0066010 A1 | 3/2008 | Brodersen et al. |

(56) References Cited

U.S. PATENT DOCUMENTS

| | | |
|---|---|---|
| 2008/0072173 A1 | 3/2008 | Brunner et al. |
| 2008/0076472 A1 | 3/2008 | Hyatt |
| 2008/0082934 A1 | 4/2008 | Kocienda et al. |
| 2008/0084970 A1 | 4/2008 | Harper |
| 2008/0085700 A1 | 4/2008 | Arora |
| 2008/0092054 A1 | 4/2008 | Bhumkar et al. |
| 2008/0092057 A1 | 4/2008 | Monson et al. |
| 2008/0095100 A1 | 4/2008 | Cleveland et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0113656 A1 | 5/2008 | Lee et al. |
| 2008/0114535 A1 | 5/2008 | Nesbitt |
| 2008/0120569 A1 | 5/2008 | Mann et al. |
| 2008/0120571 A1 | 5/2008 | Chang et al. |
| 2008/0122796 A1 | 5/2008 | Jobs |
| 2008/0132252 A1 | 6/2008 | Altman et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0162651 A1 | 7/2008 | Madnani |
| 2008/0163104 A1 | 7/2008 | Haug |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0242362 A1 | 10/2008 | Duarte |
| 2008/0250354 A1 | 10/2008 | Park |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307351 A1 | 12/2008 | Louch et al. |
| 2008/0307364 A1 | 12/2008 | Chaudhri et al. |
| 2008/0309626 A1 | 12/2008 | Westerman et al. |
| 2008/0313538 A1 | 12/2008 | Hudson |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0031247 A1 | 1/2009 | Walter et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077649 A1 | 3/2009 | Lockhart |
| 2009/0083656 A1 | 3/2009 | Dokhon |
| 2009/0085851 A1 | 4/2009 | Lim |
| 2009/0085878 A1 | 4/2009 | Heubel |
| 2009/0089215 A1 | 4/2009 | Newton |
| 2009/0089459 A1 | 4/2009 | Jeyaseelan et al. |
| 2009/0094562 A1 | 4/2009 | Jeong et al. |
| 2009/0103515 A1 | 4/2009 | Pointer |
| 2009/0106694 A1 | 4/2009 | Kraft et al. |
| 2009/0106696 A1 | 4/2009 | Duarte |
| 2009/0109243 A1 | 4/2009 | Kraft |
| 2009/0117942 A1 | 5/2009 | Boningue et al. |
| 2009/0125844 A1 | 5/2009 | Weir et al. |
| 2009/0140061 A1 | 6/2009 | Schultz et al. |
| 2009/0140986 A1 | 6/2009 | Karkkainen et al. |
| 2009/0144642 A1 | 6/2009 | Crystal |
| 2009/0144653 A1 | 6/2009 | Ubillos |
| 2009/0146962 A1 | 6/2009 | Ahonen et al. |
| 2009/0153492 A1 | 6/2009 | Popp |
| 2009/0158144 A1 | 6/2009 | Griffin |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0174679 A1 | 7/2009 | Westerman |
| 2009/0178007 A1 | 7/2009 | Matas et al. |
| 2009/0182788 A1 | 7/2009 | Chung et al. |
| 2009/0184939 A1 | 7/2009 | Wohlstadter et al. |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0249257 A1 | 10/2009 | Bove et al. |
| 2009/0265662 A1 | 10/2009 | Bamford |
| 2009/0271778 A1 | 10/2009 | Mandyam et al. |
| 2009/0284482 A1 | 11/2009 | Chin |
| 2009/0288044 A1 | 11/2009 | Matthews et al. |
| 2009/0292989 A1 | 11/2009 | Matthews et al. |
| 2009/0293007 A1* | 11/2009 | Duarte et al. .................. 715/767 |
| 2009/0293013 A1 | 11/2009 | O'Shaugnessy et al. |
| 2009/0293014 A1 | 11/2009 | Meuninck et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0318171 A1 | 12/2009 | Backholm et al. |
| 2009/0322760 A1 | 12/2009 | Kwiatkowski |
| 2009/0327969 A1 | 12/2009 | Estrada |
| 2010/0008490 A1 | 1/2010 | Gharachorloo et al. |
| 2010/0013782 A1 | 1/2010 | Liu et al. |
| 2010/0020025 A1 | 1/2010 | Lemort et al. |
| 2010/0020091 A1 | 1/2010 | Rasmussen et al. |
| 2010/0031186 A1 | 2/2010 | Tseng |
| 2010/0042911 A1 | 2/2010 | Wormald et al. |
| 2010/0050076 A1 | 2/2010 | Roth |
| 2010/0058248 A1 | 3/2010 | Park |
| 2010/0066698 A1 | 3/2010 | Seo |
| 2010/0066705 A1* | 3/2010 | Keely et al. .................. 345/179 |
| 2010/0070931 A1 | 3/2010 | Nichols |
| 2010/0073380 A1 | 3/2010 | Kaplan et al. |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079413 A1 | 4/2010 | Kawashima et al. |

(56) References Cited

U.S. PATENT DOCUMENTS

| | | |
|---|---|---|
| 2010/0081475 A1 | 4/2010 | Chiang et al. |
| 2010/0087169 A1 | 4/2010 | Lin |
| 2010/0087173 A1 | 4/2010 | Lin |
| 2010/0088635 A1 | 4/2010 | Louch |
| 2010/0100839 A1 | 4/2010 | Tseng et al. |
| 2010/0103118 A1 | 4/2010 | Townsend et al. |
| 2010/0103124 A1 | 4/2010 | Kruzeniski |
| 2010/0103370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0106607 A1 | 4/2010 | Riddiford et al. |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0122110 A1 | 5/2010 | Ordogh |
| 2010/0131901 A1 | 5/2010 | Takahashi et al. |
| 2010/0138767 A1 | 6/2010 | Wang et al. |
| 2010/0138782 A1* | 6/2010 | Rainisto ............... 715/808 |
| 2010/0138834 A1 | 6/2010 | Agarwal et al. |
| 2010/0145675 A1 | 6/2010 | Lloyd et al. |
| 2010/0146384 A1 | 6/2010 | Peev et al. |
| 2010/0146437 A1 | 6/2010 | Woodcock et al. |
| 2010/0157157 A1 | 6/2010 | Yi |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0185932 A1 | 7/2010 | Coffman et al. |
| 2010/0192102 A1 | 7/2010 | Chmielewski et al. |
| 2010/0216491 A1 | 8/2010 | Winkler et al. |
| 2010/0223569 A1 | 9/2010 | Vuong et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0251153 A1 | 9/2010 | SanGiovanni et al. |
| 2010/0265196 A1 | 10/2010 | Lee et al. |
| 2010/0281402 A1 | 11/2010 | Staikos et al. |
| 2010/0281409 A1 | 11/2010 | Rainisto et al. |
| 2010/0283743 A1 | 11/2010 | Coddington et al. |
| 2010/0289806 A1 | 11/2010 | Lao et al. |
| 2010/0293056 A1 | 11/2010 | Flynt et al. |
| 2010/0295795 A1 | 11/2010 | Wilairat |
| 2010/0298034 A1 | 11/2010 | Shin et al. |
| 2010/0302172 A1 | 12/2010 | Wilairat |
| 2010/0302176 A1 | 12/2010 | Nikula et al. |
| 2010/0302278 A1 | 12/2010 | Shaffer et al. |
| 2010/0309148 A1 | 12/2010 | Fleizach et al. |
| 2010/0311470 A1 | 12/2010 | Seo et al. |
| 2010/0313165 A1 | 12/2010 | Louch et al. |
| 2010/0321403 A1 | 12/2010 | Inadome |
| 2010/0325411 A1* | 12/2010 | Jung et al. ............... 713/100 |
| 2010/0328431 A1 | 12/2010 | Kim et al. |
| 2010/0329642 A1 | 12/2010 | Kam et al. |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0029598 A1 | 2/2011 | Arnold et al. |
| 2011/0029904 A1 | 2/2011 | Smith et al. |
| 2011/0029927 A1 | 2/2011 | Lietzke et al. |
| 2011/0029934 A1 | 2/2011 | Locker et al. |
| 2011/0043527 A1 | 2/2011 | Ording et al. |
| 2011/0055773 A1 | 3/2011 | Agarawala et al. |
| 2011/0057953 A1* | 3/2011 | Horodezky ............... 345/647 |
| 2011/0074699 A1 | 3/2011 | Marr et al. |
| 2011/0074710 A1 | 3/2011 | Weeldreyer et al. |
| 2011/0074719 A1 | 3/2011 | Yeh et al. |
| 2011/0078624 A1 | 3/2011 | Missig et al. |
| 2011/0087739 A1 | 4/2011 | Lin |
| 2011/0087988 A1 | 4/2011 | Ray et al. |
| 2011/0093778 A1 | 4/2011 | Kim et al. |
| 2011/0093816 A1 | 4/2011 | Chang et al. |
| 2011/0093821 A1 | 4/2011 | Wigdor et al. |
| 2011/0107272 A1 | 5/2011 | Aguilar |
| 2011/0109563 A1* | 5/2011 | Liu ............... 345/173 |
| 2011/0113337 A1 | 5/2011 | Liu et al. |
| 2011/0113486 A1 | 5/2011 | Hunt et al. |
| 2011/0119586 A1 | 5/2011 | Blinnikka et al. |
| 2011/0126156 A1 | 5/2011 | Krishnaraj et al. |
| 2011/0154235 A1 | 6/2011 | Min et al. |
| 2011/0157027 A1 | 6/2011 | Rissa |
| 2011/0161845 A1 | 6/2011 | Stallings et al. |
| 2011/0163968 A1 | 7/2011 | Hogan |
| 2011/0167341 A1 | 7/2011 | Cranfill et al. |
| 2011/0173556 A1 | 7/2011 | Czerwinski et al. |
| 2011/0173568 A1 | 7/2011 | Royal, Jr. et al. |
| 2011/0175930 A1 | 7/2011 | Hwang et al. |
| 2011/0179386 A1 | 7/2011 | Shaffer et al. |
| 2011/0179387 A1 | 7/2011 | Shaffer et al. |
| 2011/0185318 A1 | 7/2011 | Hinckley et al. |
| 2011/0191675 A1 | 8/2011 | Kauranen |
| 2011/0202866 A1 | 8/2011 | Huang et al. |
| 2011/0209039 A1 | 8/2011 | Hinckley et al. |
| 2011/0209089 A1 | 8/2011 | Hinckley et al. |
| 2011/0209099 A1 | 8/2011 | Hinckley |
| 2011/0209100 A1 | 8/2011 | Hinckley et al. |
| 2011/0209101 A1 | 8/2011 | Hinckley et al. |
| 2011/0209102 A1 | 8/2011 | Hinckley et al. |
| 2011/0209103 A1 | 8/2011 | Hinckley et al. |
| 2011/0209104 A1 | 8/2011 | Hinckley et al. |
| 2011/0216064 A1* | 9/2011 | Dahl et al. ............... 345/428 |
| 2011/0225547 A1 | 9/2011 | Fong et al. |
| 2011/0231796 A1 | 9/2011 | Vigil |
| 2011/0252346 A1 | 10/2011 | Chaudhri |
| 2011/0252380 A1 | 10/2011 | Chaudhri |
| 2011/0252381 A1* | 10/2011 | Chaudhri ............... 715/838 |
| 2011/0276864 A1 | 11/2011 | Oules |
| 2011/0279461 A1 | 11/2011 | Hamilton et al. |
| 2011/0316884 A1 | 12/2011 | Giambalvo et al. |
| 2011/0320978 A1 | 12/2011 | Horodezky et al. |
| 2012/0005584 A1 | 1/2012 | Seago et al. |
| 2012/0009903 A1 | 1/2012 | Schultz et al. |
| 2012/0011437 A1* | 1/2012 | James et al. ............... 715/702 |
| 2012/0028687 A1 | 2/2012 | Wykes |
| 2012/0050185 A1 | 3/2012 | Davydov et al. |
| 2012/0050332 A1 | 3/2012 | Nikara et al. |
| 2012/0072853 A1 | 3/2012 | Krigstrom et al. |
| 2012/0072953 A1* | 3/2012 | James et al. ............... 725/52 |
| 2012/0084704 A1* | 4/2012 | Lee et al. ............... 715/776 |
| 2012/0102433 A1 | 4/2012 | Falkenburg |
| 2012/0151397 A1 | 6/2012 | Oberstein et al. |
| 2012/0159395 A1 | 6/2012 | Deutsch et al. |
| 2012/0159402 A1 | 6/2012 | Nurmi et al. |
| 2012/0161791 A1 | 6/2012 | Shaw |
| 2012/0162266 A1 | 6/2012 | Douglas et al. |
| 2012/0167008 A1 | 6/2012 | Zaman |
| 2012/0167011 A1 | 6/2012 | Zaman |
| 2012/0174005 A1 | 7/2012 | Deutsch |
| 2012/0174029 A1 | 7/2012 | Bastide et al. |
| 2012/0174034 A1 | 7/2012 | Chae et al. |
| 2012/0179992 A1 | 7/2012 | Smuga |
| 2012/0180001 A1 | 7/2012 | Griffin et al. |
| 2012/0208501 A1* | 8/2012 | Tsuda ............... 455/411 |
| 2012/0210265 A1 | 8/2012 | Delia et al. |
| 2012/0212495 A1 | 8/2012 | Butcher |
| 2012/0216139 A1 | 8/2012 | Ording et al. |
| 2012/0233571 A1 | 9/2012 | Wever et al. |
| 2012/0235930 A1* | 9/2012 | Lazaridis et al. ............... 345/173 |
| 2012/0244841 A1 | 9/2012 | Teng et al. |
| 2012/0254780 A1 | 10/2012 | Mouton et al. |
| 2012/0254808 A1 | 10/2012 | Gildfind |
| 2012/0265644 A1 | 10/2012 | Roa et al. |
| 2012/0272181 A1 | 10/2012 | Rogers et al. |

(56) References Cited

U.S. PATENT DOCUMENTS

| | | |
|---|---|---|
| 2012/0278727 A1 | 11/2012 | Ananthakrishnan et al. |
| 2012/0290962 A1 | 11/2012 | Zielinski et al. |
| 2012/0299968 A1 | 11/2012 | Wong et al. |
| 2012/0304068 A1 | 11/2012 | Zaman et al. |
| 2012/0304092 A1 | 11/2012 | Jarrett et al. |
| 2012/0304102 A1 | 11/2012 | LeVee et al. |
| 2012/0304106 A1 | 11/2012 | LeVee et al. |
| 2012/0304107 A1 | 11/2012 | Nan et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0304131 A1 | 11/2012 | Nan et al. |
| 2012/0304132 A1 | 11/2012 | Sareen et al. |
| 2012/0304133 A1 | 11/2012 | Nan et al. |
| 2012/0311485 A1 | 12/2012 | Caliendo, Jr. et al. |
| 2012/0322527 A1* | 12/2012 | Aoki et al. .............. 463/16 |
| 2012/0323992 A1 | 12/2012 | Brobst et al. |
| 2013/0033525 A1 | 2/2013 | Markiewicz |
| 2013/0042203 A1 | 2/2013 | Wong et al. |
| 2013/0042206 A1 | 2/2013 | Zaman et al. |
| 2013/0044136 A1 | 2/2013 | Matthews |
| 2013/0044141 A1 | 2/2013 | Markiewicz |
| 2013/0047079 A1 | 2/2013 | Kroeger et al. |
| 2013/0047105 A1 | 2/2013 | Jarrett |
| 2013/0047117 A1 | 2/2013 | Deutsch |
| 2013/0047126 A1 | 2/2013 | Sareen |
| 2013/0057587 A1 | 3/2013 | Leonard et al. |
| 2013/0057588 A1 | 3/2013 | Leonard |
| 2013/0063442 A1 | 3/2013 | Zaman |
| 2013/0063443 A1 | 3/2013 | Garside |
| 2013/0063465 A1 | 3/2013 | Zaman |
| 2013/0063490 A1 | 3/2013 | Zaman |
| 2013/0067381 A1 | 3/2013 | Yalovsky |
| 2013/0067390 A1 | 3/2013 | Kwiatkowski |
| 2013/0067391 A1 | 3/2013 | Pittappilly |
| 2013/0067398 A1 | 3/2013 | Pittappilly |
| 2013/0067399 A1 | 3/2013 | Elliott |
| 2013/0067412 A1 | 3/2013 | Leonard |
| 2013/0067420 A1 | 3/2013 | Pittappilly |
| 2013/0093757 A1 | 4/2013 | Cornell |
| 2013/0102366 A1 | 4/2013 | Teng |
| 2013/0179781 A1 | 7/2013 | Nan et al. |
| 2013/0268422 A1 | 10/2013 | Ram et al. |
| 2013/0297700 A1 | 11/2013 | Hayton et al. |
| 2014/0082552 A1 | 3/2014 | Zaman |
| 2014/0298245 A1 | 10/2014 | Tappen et al. |

FOREIGN PATENT DOCUMENTS

| | | |
|---|---|---|
| CN | 1749936 | 3/2006 |
| CN | 1786906 | 6/2006 |
| CN | 1851641 | 10/2006 |
| CN | 1936797 | 3/2007 |
| CN | 101006425 | 7/2007 |
| CN | 101075174 | 11/2007 |
| CN | 101114303 | 1/2008 |
| CN | 101228570 | 7/2008 |
| CN | 101770332 | 7/2010 |
| CN | 101809531 | 8/2010 |
| CN | 102197702 | 9/2011 |
| CN | 102624970 | 8/2012 |
| CN | 103105995 | 5/2013 |
| CN | 103197837 | 7/2013 |
| CN | 103475784 | 12/2013 |
| CN | 103562858 | 2/2014 |
| CN | 103562917 | 2/2014 |
| EP | 0583060 | 2/1994 |
| EP | 1337093 | 8/2003 |
| EP | 1526463 | 4/2005 |
| EP | 1752868 | 2/2007 |
| EP | 1939718 | 7/2008 |
| EP | 2535809 | 12/2012 |
| GB | 2350991 | 12/2000 |
| JP | 2004227393 | 8/2004 |
| JP | 2004357257 | 12/2004 |
| JP | 2006139615 | 6/2006 |
| KR | 200303655 | 2/2003 |
| KR | 20060019198 | 3/2006 |
| KR | 1020070036114 | 4/2007 |
| KR | 20070093585 | 9/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 20080084156 | 9/2008 |
| KR | 1020080084156 | 9/2008 |
| KR | 1020080113913 | 12/2008 |
| KR | 20090002951 | 1/2009 |
| KR | 1020090041635 | 4/2009 |
| KR | 20090053143 | 5/2009 |
| KR | 20100010072 | 2/2010 |
| KR | 20100048375 | 5/2010 |
| KR | 20100056369 | 5/2010 |
| KR | 1020100056369 | 5/2010 |
| TW | 201023026 | 6/2010 |
| WO | WO-9926127 | 5/1999 |
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2008084211 | 7/2008 |
| WO | WO-2008146784 | 12/2008 |
| WO | WO-2009000043 | 12/2008 |
| WO | WO-2009012398 | 1/2009 |
| WO | WO-2009049331 | 4/2009 |
| WO | WO-2009054809 | 4/2009 |
| WO | WO-2010024969 | 3/2010 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010117661 | 10/2010 |
| WO | WO-2010135155 | 11/2010 |
| WO | WO-2011041885 | 4/2011 |

OTHER PUBLICATIONS

"How-to close an application in BlackBerry PlayBook?", Retrieved at <<http://stackoverflow.com/questions/5277027/how-to-close-an-application-in-blackberry-playbook>>, Retrieved Date: Sep. 18, 2011, pp. 2.

Bhatnagar, Abhishek, "Locate and Kill Annoying Processes in Windows", Retrieved at <<http://www.troublefixers.com/locate-and-kill-annoying-processes-in-windows/>>, Apr. 19, 2010, pp. 4.

"Advanced Task Killer", Retrieved at <<http://www.androidtapp.com/advanced-task-killer/>>, Retrieved Date: Sep. 18, 2011, pp. 15.

"Adobe Acrobat 8 Standard User Guide", Adobe Systems Incorporated, 2007, pp. 34 & 36.

"Advisory Action", U.S. Appl. No. 12/414,382, Jan. 20, 2012, 3 pages.

"Advisory Action", U.S. Appl. No. 12/433,605, Apr. 5, 2012, 3 pages.

"Alltel Adds Dedicated Search Key to Phones", Retrieved from: <http://www.phonescoop.com/news/item.php?n=2159> on Nov. 26, 2008., Apr. 12, 2007, 2 Pages.

"Android 2.3 User's Guide", AUG-2.3-103, Android mobile technology platform 2.3, Dec. 13, 2010, 380 pages.

"Apple iPhone—8GB AT&T", Retrieved from: <http://nytimes.com.com/smartphones/apple-iphone-8gb-at/4515-6452_7-32309245.html> on Nov. 20, 2008, Jun. 29, 2007, 11 pages.

"Application User Model IDs", Retrieved from: <http://msdn.microsoft.com/en-us/library/dd378459(VS.85).aspx> on Sep. 28, 2010, 2010, 6 pages.

(56) References Cited

OTHER PUBLICATIONS

"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., Nov. 11, 2008, 3 pages.

"Basics of Your Device: Get Familiar with the Home Screen", Nokia USA—How to—retrieved from <http://www.nokia.ca/get-support-and-software/product-support/c6-01/how-to#> on May 11, 2011, 3 pages.

"Blackberry office tools: Qwerty Convert", Retrieved from: <http://blackberrysoftwarelist.net/blackberry/download-software/blackberry-office/qwerty_convert.aspx> on Nov. 20, 2008, 1 page.

"Calc4M", Retrieved from: <http://www.hellebo.com/Calc4M.html> on Dec. 11, 2008, Sep. 10, 2008, 4 Pages.

"Class ScrollView", Retrieved from: <http://www.blackberry.com/developers/docs/6.0.0api/net/rim/device/api/ui/ScrollView.html> on Sep. 28, 2010, 13 pages.

"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, 2009, 5 Pages.

"Dial a number", Retrieved from: <http://www.phonespell.org/ialhelp.html> on Nov. 20, 2008, 1 page.

"DuoSense™ Multi-Touch Gestures", Retrieved from: <http://www.n-trig.com/Data/Uploads/Misc/DuoSenseMTG_final/pdf>, Jul. 2008, 4 pages.

"Elecont Quick Desktop 1.0.43", Retrieved from: <http://handheld.softpedia.com/get/System-Utilities/Launcher-Applications/Elecont-Quick-Desktop-72131.shtml> on May 5, 2009., Mar. 13, 2009, 2 pages.

"Email Notification for Microsoft Outlook and Outlook Express", Retrieved from: <http://www.contextmagic.com/express-notification/> Sep. 29, 2010, Jul. 21, 2004, 3 pages.

"Enhanced IBM Power Systems Software and PowerVM Restructuring", IBM United States Announcement 208-082, dated Apr. 8, 2008, available at <http://www.ibm.com/common/ssi/rep_ca/2/897/ENUS208-082/ENUS208082.PDF>,Apr. 8, 2008, pp. 1-19.

"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, Aug. 1, 2008, 14 pages.

"Extended European Search Report", EP Application No. 09818253.8, Apr. 10, 2012, 7 pages.

"Extended European Search Report", EP Application No. 09822736.6, Dec. 18, 2012, 7 pages.

"Extended European Search Report", EP Application No. 10762112.0, Aug. 2, 2013, 7 Pages.

"eXtreme Energy Conservation: Advanced Power-Saving Software for Wireless Devices", White Paper, Freescale Semiconductor, Inc., Document No. XTMENRGYCNSVWP, Rev #0, available at <http://www.freescale.com/files/32bit/doc/white_paper/XTMENRGYCNSVWP.pdf>,Feb. 2006, 15 pages.

"Final Office Action", U.S. Appl. No. 11/305,789, Apr. 1, 2009, 10 pages.

"Final Office Action", U.S. Appl. No. 11/502,264, Feb. 4, 2010, 15 pages.

"Final Office Action", U.S. Appl. No. 11/502,264, Mar. 29, 2013, 16 pages.

"Final Office Action", U.S. Appl. No. 11/502,264, Apr. 3, 2009, 9 pages.

"Final Office Action", U.S. Appl. No. 12/244,545, Dec. 7, 2011, 16 pages.

"Final Office Action", U.S. Appl. No. 12/244,545, Sep. 7, 2012, 23 pages.

"Final Office Action", U.S. Appl. No. 12/413,977, Nov. 17, 2011, 16 pages.

"Final Office Action", U.S. Appl. No. 12/414,382, Dec. 23, 2011, 7 pages.

"Final Office Action", U.S. Appl. No. 12/414,476, Apr. 8, 2013, 25 pages.

"Final Office Action", U.S. Appl. No. 12/414,476, Dec. 1, 2011, 20 pages.

"Final Office Action", U.S. Appl. No. 12/433,605, Jul. 17, 2013, 13 pages.

"Final Office Action", U.S. Appl. No. 12/433,605, Feb. 3, 2012, 11 pages.

"Final Office Action", U.S. Appl. No. 12/433,667, Jan. 7, 2013, 17 pages.

"Final Office Action", U.S. Appl. No. 12/433,667, Sep. 13, 2011, 17 pages.

"Final Office Action", U.S. Appl. No. 12/469,458, Feb. 1, 2013, 19 pages.

"Final Office Action", U.S. Appl. No. 12/469,458, Nov. 17, 2011, 15 pages.

"Final Office Action", U.S. Appl. No. 12/469,480, Apr. 10, 2013, 21 pages.

"Final Office Action", U.S. Appl. No. 12/469,480, Feb. 9, 2012, 17 pages.

"Final Office Action", U.S. Appl. No. 12/480,969, Nov. 23, 2012, 18 pages.

"Final Office Action", U.S. Appl. No. 12/480,969, Jul. 24, 2013, 19 pages.

"Final Office Action", U.S. Appl. No. 12/484,799, Apr. 30, 2012, 13 pages.

"Final Office Action", U.S. Appl. No. 12/560,081, Mar. 14, 2012, 16 pages.

"Final Office Action", U.S. Appl. No. 12/577,400, Aug. 16, 2013, 25 pages.

"Final Office Action", U.S. Appl. No. 12/577,400, Sep. 14, 2012, 26 pages.

"Final Office Action", U.S. Appl. No. 12/721,422, Mar. 7, 2013, 10 pages.

"Final Office Action", U.S. Appl. No. 12/972,967, Oct. 11, 2013, 21 pages.

"Final Office Action", U.S. Appl. No. 12/983,106, Oct. 7, 2013, 19 pages.

"Final Office Action", U.S. Appl. No. 13/118,181, Dec. 20, 2013, 18 pages.

"Final Office Action", U.S. Appl. No. 13/118,204, Nov. 21, 2013, 24 pages.

"Final Office Action", U.S. Appl. No. 13/118,221, Mar. 17, 2014, 21 pages.

"Final Office Action", U.S. Appl. No. 13/118,321, Dec. 19, 2013, 30 pages.

"Final Office Action", U.S. Appl. No. 13/118,339, Aug. 22, 2013, 21 pages.

"Final Office Action", U.S. Appl. No. 13/118,347, Aug. 15, 2013, 25 pages.

"Final Office Action", U.S. Appl. No. 13/224,258, Sep. 11, 2013, 37 pages.

"Final Office Action", U.S. Appl. No. 13/229,693, Sep. 4, 2013, 23 pages.

"Final Office Action", U.S. Appl. No. 13/345,383, Jul. 30, 2013, 27 pages.

"Final Office Action", U.S. Appl. No. 13/655,386, Jun. 6, 2013, 34 pages.

"Final Office Action", U.S. Appl. No. 13/656,354, Jun. 17, 2013, 14 pages.

"Final Office Action", U.S. Appl. No. 13/656,574, Aug. 23, 2013, 20 pages.

"Final Office Action", U.S. Appl. No. 13/657,621, Sep. 10, 2013, 18 pages.

"Final Office Action", U.S. Appl. No. 13/657,646, May 6, 2013, 12 pages.

"Final Office Action", U.S. Appl. No. 13/657,789, Jun. 21, 2013, 35 pages.

"Final Office Action", U.S. Appl. No. 13/658,694, Oct. 30, 2013, 17 pages.

"Foreign Office Action", CN Application No. 200980142644.1, Aug. 20, 2013, 9 Pages.

(56) References Cited

OTHER PUBLICATIONS

"Foreign Office Action", CN Application No. 200980142661.5, Sep. 24, 2013, 8 Pages.
"Foreign Office Action", JP Application No. 2011-533353, Jul. 5, 2013, 9 Pages.
"Foreign Office Action", CL Application No. 2379-2011, Jul. 3, 2013, 8 pages.
"Foreign Office Action", CN Application No. 200980139831.4, Jul. 1, 2013, 12 pages.
"Foreign Office Action", CN Application No. 200980142632.9, Jun. 14, 2013, 6 pages.
"Foreign Office Action", CN Application No. 200980142632.9, Jan. 29, 2013, 11 pages.
"Foreign Office Action", CN Application No. 200980142644.1, Apr. 3, 2013, 10 pages.
"Foreign Office Action", CN Application No. 200980142661.5, Jan. 21, 2013, 12 pages.
"Foreign Office Action", CN Application No. 201080015728.1, May 16, 2013, 10 pages.
"Foreign Office Action", CN Application No. 201080015728.1, Dec. 26, 2012, 9 pages.
"Foreign Office Action", CN Application No. 201080015788.3, Jun. 5, 2013, 12 Pages.
"Foreign Office Action", CN Application No. 201080015788.3, Dec. 24, 2012, 10 pages.
"Foreign Office Action", CN Application No. 201080023212.1, Dec. 5, 2012, 10 pages.
"Foreign Office Action", CN Application No. 201080023212.1, Jun. 5, 2013, 8 pages.
"Foreign Office Action", CN Application No. 201080045865.X, Dec. 4, 2012, 10 pages.
"Foreign Office Action", CN Application No. 201080045865.X, Jun. 4, 2013, 10 pages.
"Foreign Office Action", CN Application No. 201110429183.5, Jan. 6, 2014, 10 Pages.
"Foreign Office Action", CN Application No. 201110437542.1, Jan. 6, 2014, 10 Pages.
"Foreign Office Action", CN Application No. 201110437572.2, Dec. 3, 2013, 7 pages.
"Foreign Office Action", CN Application No. 201110454251.3, Dec. 27, 2013, 12 Pages.
"Foreign Office Action", EP Application No. 10823883.3, Aug. 10, 2012, 5 pages.
"Foreign Office Action", JP Application No. 2012-503523, Apr. 22, 2013, 5 Pages.
"Freeware.mobi", Retrieved from: <http://www.palmfreeware.mobi/download-palette.html> on Nov. 6, 2008, Oct. 9, 2001, 2 pages.
"GnomeCanvas", Retrieved from: <http://library.gnome.org/devel/libgnomecanvas/unstable/GnomeCanvas.html> on Sep. 28, 2010, 11 pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011, May 28, 2010, 1 page.
"How do I use Categories with my Weblog?", Retrieved from: <http://tpsupport.mtcs.sixapart.com/tp/us-tp1/how_do_i_use_categorieswith_my_weblog.html> on Sep. 28, 2010, Sep. 16, 2009, 3 pages.
"How do you dial 1-800-Flowers", Retrieved from: <http://blogs.msdn.com/windowsmobile/archive/2007/02/06/how-do-you-dial-1-800-flowers.aspx> on Nov. 20, 2008, Feb. 6, 2007, 24 pages.
"HTC Shows HTC Snap with Snappy Email Feature", Retrieved from: <http://www.wirelessandmobilenews.com/smartphones/ on May 5, 2009>, May 4, 2009, 10 Pages.
"IntelliScreen-New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, May 13, 2008, 11 pages.
"International Search Report and Written Opinion", Application No. PCT/US2010/028555, Oct. 12, 2010, 10 pages.
"International Search Report and Written Opinion", Application No. PCT/US2010/028699, Oct. 4, 2010, 10 pages.
"International Search Report and Written Opinion", Application No. PCT/US2013/059563, Nov. 7, 2013, 10 pages.
"International Search Report and Written Opinion", Application No. PCT/US2011/067075, Dec. 12, 2012, 10 pages.
"International Search Report and Written Opinion", Application No. PCT/US2009/061864, May 14, 2010, 10 pages.
"International Search Report and Written Opinion", Application No. PCT/US2009/061382, May 26, 2010, 10 pages.
"International Search Report and Written Opinion", Application No. PCT/US2011/055725, Sep. 27, 2012, 10 pages.
"International Search Report and Written Opinion", Application No. PCT/US2009/061735, Jun. 7, 2010, 11 pages.
"International Search Report and Written Opinion", Application No. PCT/US2010/034772, Dec. 29, 2010, 12 pages.
"International Search Report and Written Opinion", Application No. PCT/US2012/047091, Dec. 27, 2012, 15 pages.
"International Search Report and Written Opinion", Application No. PCT/US2013/061066, Feb. 4, 2014, 17 pages.
"International Search Report and Written Opinion", Application No. PCT/US2010/038730, Jan. 19, 2011, 8 pages.
"International Search Report and Written Opinion", Application No. PCT/US2011/055513, Mar. 27, 2012, 8 pages.
"International Search Report and Written Opinion", Application No. PCT/US2010/052119, May 2, 2011, 8 pages.
"International Search Report and Written Opinion", Application No. PCT/US2011/055514, May 22, 2012, 8 pages.
"International Search Report and Written Opinion", Application No. PCT/US2011/055512, May 24, 2012, 8 pages.
"International Search Report and Written Opinion", Application No. PCT/US2011/055520, May 9, 2012, 8 pages.
"International Search Report and Written Opinion", Application No. PCT/US2011/055524, Jun. 1, 2012, 8 pages.
"International Search Report and Written Opinion", Application No. PCT/US2011/065702, Aug. 29, 2012, 8 pages.
"International Search Report and Written Opinion", Application No. PCT/US2011/055736, Sep. 17, 2012, 8 pages.
"International Search Report and Written Opinion", Application No. PCT/US2011/067073, Sep. 17, 2012, 8 pages.
"International Search Report and Written Opinion", Application No. PCT/US2011/055511, Apr. 24, 2012, 9 pages.
"International Search Report and Written Opinion", Application No. PCT/US2011/055523, May 10, 2012, 9 pages.
"International Search Report and Written Opinion", Application No. PCT/US2011/055521, May 15, 2012, 9 pages.
"International Search Report and Written Opinion", Application No. PCT/US2011/055522, May 15, 2012, 9 pages.
"International Search Report and Written Opinion", Application No. PCT/US2011/055496, Sep. 12, 2012, 9 pages.
"International Search Report and Written Opinion", Application No. PCT/US2011/055712, Sep. 21, 2012, 9 pages.
"International Search Report and Written Opinion", Application No. PCT/US2011/055493, 9/26/212, 9 pages.
"International Search Report and Written Opinion", Application No. PCT/US2011/055478, Sep. 27, 2012, 9 pages.
"International Search Report and Written Opinion", Application No. PCT/US2011/055746, Sep. 27, 2012, 9 pages.
"International Search Report and Written Opinion", Application No. PCT/US2010/028553, Application Filing Date: Mar. 24, 2010,Nov. 9, 2010, 9 pages.
"Internet Explorer Window Restrictions", Retrieved from: http://technet.microsoft.com/en-us/library/cc759517(WS.10).aspx on Jun. 28, 2011, Microsoft TechNet, 5 pages.
"Introducing Application Styling for Windows Forms", Infragistics Software Manual, Version 7.3.20073.1043, Nov. 2007, 95 pages.
"Introduction to Windows Touch", Retrieved from: <http://download.microsoft.com/download/a/d/f/adf1347d-08dc-41a4-9084-623b1194d4b2/Win7_touch.docx>, Dec. 18, 2008, pp. 1-7.

(56) References Cited

OTHER PUBLICATIONS

"iPad User Guide", retrieved from <http://cyndidannerkuhn.info/CDK/iPads_Resources_files/iPad_User_Guide.pdf> on Jun. 17, 2011, 154 pages.
"iPod touch User Guide for iPhone OS 3.0 Software", Apple Inc., 2009, 153 pages.
"Keyboard (5)", Retrieved from: <http://landru.uwaterloo.ca/cgi-bin/man.cgi?section=5&topic=keyboard> on Dec. 11, 2008., Aug. 11, 1997, 8 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009., Nov. 2005, 5 pages.
"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for the kiosk browser, Kiosk Project Kiosk Browser Chrome Customization Firefox-2.x,Aug. 16, 2007, 2 pages.
"Live Photo Gallery—Getting Started—from Camera to Panorama", Retrieved from: <http://webdotwiz.spaces.live.com/blog/cns!2782760752B93233!1729.entry> on May 5, 2009., Sep. 2008, 7 Pages.
"Magic mouse", Retrieved from: <http://www.apple.com/magicmouse/> on May 10, 2011, 3 pages.
"MIDTB Tip Sheet: Book Courier", Retrieved from: <http://www.midtb.org/tipsbookcourier.htm> on Dec. 11, 2008., Sep. 26, 2005, 6 Pages.
"Mobile/UI/Designs/TouchScreen/workingUI", Retrieved from: <https://wiki.mozilla.org/Mobile/UI/Designs/TouchScreen/workingUI> on Oct. 26, 2009, 2009, 30 pages.
"moGo beta v.0.4", Retrieved from: <http://forum.xda-developers.com/showthread.php?t=375196> on Sep. 27, 2010, Mar. 7, 2008, 10 pages.
"Multi-touch", Retrieved from <http://en.wikipedia.org/wiki/Multi-touch#Microsoft_Surface> on Apr. 24, 2009, Apr. 17, 2009, 8 pages.
"My Favorite Gadgets, System Monitor II", Retrieved from <http://www.myfavoritegadgets.info/monitors/SystemMonitorII/system-monitorII.html> on Mar. 12, 2013, Jun. 8, 2010, 5 pages.
"New Features in WhatsUp Gold v12.0", retrieved from <http://www.netbright.co.th/?name=product&file=readproduct&id=12> on Jun. 10, 2011, 4 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., Jan. 27, 2006, 2 Pages.
"Non-Final Office Action", U.S. Appl. No. 13/228,707, Oct. 25, 2013, 12 pages.
"Non-Final Office Action", U.S. Appl. No. 13/228,888, Feb. 10, 2014, 21 pages.
"Non-Final Office Action", U.S. Appl. No. 11/215,052, Jun. 23, 2011, 17 pages.
"Non-Final Office Action", U.S. Appl. No. 11/305,789, Sep. 21, 2009, 5 pages.
"Non-Final Office Action", U.S. Appl. No. 11/502,264, Sep. 30, 2009, 15 pages.
"Non-Final Office Action", U.S. Appl. No. 11/502,264, Sep. 14, 2012, 14 pages.
"Non-Final Office Action", U.S. Appl. No. 12/244,545, Mar. 27, 2012, 18 pages.
"Non-Final Office Action", U.S. Appl. No. 12/244,545, Aug. 17, 2011, 15 pages.
"Non-Final Office Action", U.S. Appl. No. 12/413,977, Jul. 19, 2011, 17 pages.
"Non-Final Office Action", U.S. Appl. No. 12/413,977, Jul. 20, 2012, 18 pages.
"Non-Final Office Action", U.S. Appl. No. 12/414,382, Jul. 26, 2011, 9 pages.
"Non-Final Office Action", U.S. Appl. No. 12/414,434, Jan. 17, 2012, 7 pages.
"Non-Final Office Action", U.S. Appl. No. 12/414,434, May 31, 2012, 7 pages.
"Non-Final Office Action", U.S. Appl. No. 12/414,434, Aug. 2, 2011, 6 pages.
"Non-Final Office Action", U.S. Appl. No. 12/414,455, Aug. 29, 2011, 8 pages.
"Non-Final Office Action", U.S. Appl. No. 12/414,458, Jul. 6, 2011, 8 pages.
"Non-Final Office Action", U.S. Appl. No. 12/414,476, Nov. 9, 2012, 22 pages.
"Non-Final Office Action", U.S. Appl. No. 12/414,476, Aug. 3, 2011, 21 pages.
"Non-Final Office Action", U.S. Appl. No. 12/433,605, Jan. 11, 2013, 7 pages.
"Non-Final Office Action", U.S. Appl. No. 12/433,605, Jun. 24, 2011, 10 pages.
"Non-Final Office Action", U.S. Appl. No. 12/433,667, Jun. 7, 2011, 15 pages.
"Non-Final Office Action", U.S. Appl. No. 12/433,667, Feb. 3, 2012, 16 pages.
"Non-Final Office Action", U.S. Appl. No. 12/469,419, Nov. 9, 2011, 15 pages.
"Non-Final Office Action", U.S. Appl. No. 12/469,419, May 23, 2012, 13 pages.
"Non-Final Office Action", U.S. Appl. No. 12/469,458, May 3, 2013, 21 pages.
"Non-Final Office Action", U.S. Appl. No. 12/469,458, Jul. 1, 2011, 15 pages.
"Non-Final Office Action", U.S. Appl. No. 12/469,458, Sep. 21, 2012, 14 pages.
"Non-Final Office Action", U.S. Appl. No. 12/469,480, Aug. 27, 2013, 22 pages.
"Non-Final Office Action", U.S. Appl. No. 12/469,480, Oct. 17, 2012, 16 pages.
"Non-Final Office Action", U.S. Appl. No. 12/469,480, Sep. 22, 2011, 14 pages.
"Non-Final Office Action", U.S. Appl. No. 12/470,558, Nov. 22, 2011, 9 pages.
"Non-Final Office Action", U.S. Appl. No. 12/480,969, Apr. 4, 2013, 22 pages.
"Non-Final Office Action", U.S. Appl. No. 12/480,969, Aug. 7, 2012, 15 pages.
"Non-Final Office Action", U.S. Appl. No. 12/484,799, Aug. 11, 2011, 12 pages.
"Non-Final Office Action", U.S. Appl. No. 12/484,799, Aug. 7, 2012, 13 pages.
"Non-Final Office Action", U.S. Appl. No. 12/484,845, Dec. 7, 2011, 16 pages.
"Non-Final Office Action", U.S. Appl. No. 12/560,081, Dec. 7, 2011, 16 pages.
"Non-Final Office Action", U.S. Appl. No. 12/577,400, Apr. 15, 2013, 25 pages.
"Non-Final Office Action", U.S. Appl. No. 12/577,400, Apr. 11, 2012, 22 pages.
"Non-Final Office Action", U.S. Appl. No. 12/721,422, Oct. 1, 2012, 7 pages.
"Non-Final Office Action", U.S. Appl. No. 12/972,967, Jan. 30, 2013, 19 pages.
"Non-Final Office Action", U.S. Appl. No. 12/977,584, Dec. 7, 2012, 8 pages.
"Non-Final Office Action", U.S. Appl. No. 12/978,184, Jan. 23, 2013, 7 pages.
"Non-Final Office Action", U.S. Appl. No. 12/983,106, Nov. 9, 2012, 17 pages.
"Non-Final Office Action", U.S. Appl. No. 13/073,300, Jul. 25, 2013, 13 pages.
"Non-Final Office Action", U.S. Appl. No. 13/118,181, Mar. 4, 2013, 22 pages.
"Non-Final Office Action", U.S. Appl. No. 13/118,204, Feb. 28, 2013, 13 pages.
"Non-Final Office Action", U.S. Appl. No. 13/118,221, Mar. 1, 2013, 22 pages.

(56) References Cited

OTHER PUBLICATIONS

"Non-Final Office Action", U.S. Appl. No. 13/118,257, Mar. 5, 2013, 19 pages.
"Non-Final Office Action", U.S. Appl. No. 13/118,302, Mar. 4, 2014, 10 pages.
"Non-Final Office Action", U.S. Appl. No. 13/118,314, Feb. 27, 2014, 13 pages.
"Non-Final Office Action", U.S. Appl. No. 13/118,321, Jun. 10, 2013, 32 pages.
"Non-Final Office Action", U.S. Appl. No. 13/118,333, Jul. 5, 2013, 18 pages.
"Non-Final Office Action", U.S. Appl. No. 13/118,339, Feb. 11, 2013, 15 pages.
"Non-Final Office Action", U.S. Appl. No. 13/118,347, Feb. 12, 2013, 14 pages.
"Non-Final Office Action", U.S. Appl. No. 13/196,272, Feb. 6, 2013, 10 pages.
"Non-Final Office Action", U.S. Appl. No. 13/196,272, Sep. 3, 2013, 5 pages.
"Non-Final Office Action", U.S. Appl. No. 13/224,258, Jan. 8, 2013, 35 pages.
"Non-Final Office Action", U.S. Appl. No. 13/228,876, Nov. 22, 2013, 14 pages.
"Non-Final Office Action", U.S. Appl. No. 13/229,155, Nov. 18, 2013, 14 pages.
"Non-Final Office Action", U.S. Appl. No. 13/229,556, Mar. 28, 2014, 12 pages.
"Non-Final Office Action", U.S. Appl. No. 13/229,693, Mar. 12, 2013, 21 pages.
"Non-Final Office Action", U.S. Appl. No. 13/345,383, Feb. 28, 2013, 25 pages.
"Non-Final Office Action", U.S. Appl. No. 13/492,495, Dec. 19, 2012, 6 pages.
"Non-Final Office Action", U.S. Appl. No. 13/492,495, Sep. 17, 2012, 8 pages.
"Non-Final Office Action", U.S. Appl. No. 13/655,386, Dec. 26, 2012, 23 pages.
"Non-Final Office Action", U.S. Appl. No. 13/655,390, Dec. 17, 2012, 12 pages.
"Non-Final Office Action", U.S. Appl. No. 13/656,354, Feb. 6, 2013, 10 pages.
"Non-Final Office Action", U.S. Appl. No. 13/656,574, Jan. 31, 2013, 21 pages.
"Non-Final Office Action", U.S. Appl. No. 13/656,639, Feb. 7, 2013, 29 pages.
"Non-Final Office Action", U.S. Appl. No. 13/657,621, Feb. 7, 2013, 19 pages.
"Non-Final Office Action", U.S. Appl. No. 13/657,646, Jan. 3, 2013, 13 pages.
"Non-Final Office Action", U.S. Appl. No. 13/657,789, Jan. 9, 2013, 38 pages.
"Non-Final Office Action", U.S. Appl. No. 13/658,694, Feb. 13, 2014, 19 pages.
"Non-Final Office Action", U.S. Appl. No. 13/658,694, Apr. 26, 2013, 13 pages.
"Notice of Allowance", U.S. Appl. No. 11/215,052, Mar. 14, 2012, 5 pages.
"Notice of Allowance", U.S. Appl. No. 11/305,789, Nov. 23, 2009, 8 pages.
"Notice of Allowance", U.S. Appl. No. 12/414,382, Apr. 4, 2012, 4 pages.
"Notice of Allowance", U.S. Appl. No. 12/414,434, Aug. 17, 2012, 4 pages.
"Notice of Allowance", U.S. Appl. No. 12/414,455, Jan. 4, 2012, 4 pages.
"Notice of Allowance", U.S. Appl. No. 12/414,458, Oct. 31, 2011, 2 pages.
"Notice of Allowance", U.S. Appl. No. 12/414,458, Nov. 29, 2011, 2 pages.
"Notice of Allowance", U.S. Appl. No. 12/414,458, Aug. 10, 2011, 6 pages.
"Notice of Allowance", U.S. Appl. No. 12/433,667, Jun. 25, 2013, 14 pages.
"Notice of Allowance", U.S. Appl. No. 12/469,419, Nov. 27, 2012, 13 pages.
"Notice of Allowance", U.S. Appl. No. 12/470,558, Apr. 2, 2012, 7 pages.
"Notice of Allowance", U.S. Appl. No. 12/470,558, Aug. 23, 2012, 2 pages.
"Notice of Allowance", U.S. Appl. No. 12/484,799, Oct. 22, 2012, 10 pages.
"Notice of Allowance", U.S. Appl. No. 12/484,845, Mar. 16, 2012, 5 pages.
"Notice of Allowance", U.S. Appl. No. 12/721,422, Jul. 11, 2013, 9 pages.
"Notice of Allowance", U.S. Appl. No. 12/977,584, Jun. 19, 2013, 5 pages.
"Notice of Allowance", U.S. Appl. No. 12/978,184, Nov. 6, 2013, 5 pages.
"Notice of Allowance", U.S. Appl. No. 12/978,184, Aug. 2, 2013, 5 pages.
"Notice of Allowance", U.S. Appl. No. 13/196,272, Nov. 8, 2013, 8 pages.
"Notice of Allowance", U.S. Appl. No. 13/492,495, Apr. 26, 2013, 5 pages.
"Notice of Allowance", U.S. Appl. No. 13/655,390, May 24, 2013, 5 pages.
"Notice of Allowance", U.S. Appl. No. 13/656,639, Aug. 19, 2013, 14 pages.
"Notifications", retrieved from <http://msdn.microsoft.com/en-us/library/aa511497.aspx> on May 10, 2011, 16 pages.
"OmneMon™ System Resource Metrics", retrieved from <http://www.omnesys.com/documents/OmneMonSRM_Brochure.pdf> on Jun. 10, 2011, 3 pages.
"ONYX Graphics Announces New ONYX Prepedge Job Preparation Software", retrieved from <http://www.largeformatreview.com/rip-software/433-onyx-graphics-announces-new-onyx-> on May 10, 2011, 2 pages.
"Oracle Mobile Sales Assistant User Guide for BlackBerry", Retrieved from <http://download.oracle.com/docs/cd/E12547_01/books/PDF/MobileSalesAsstBB.pdf.>, Nov. 2008, 20 pages.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., Dec. 1999, 8 pages.
"Oracle8i Application Developer's Guide—Advanced Queuing", Retrieved from: http://www.cs.umbc.edu/help/oracle8/server.815/a68005/03_adq1i.htm on May 6, 2009., Feb. 1999, 29 Pages.
"Oracle8i Concepts Release 8.1.5", Retrieved from: http://www.cs.umbc.edu/help/oracle8/server.815/a67781/c16queue.htm on May 6, 2009., Feb. 1999, 10 Pages.
"Palette Extender 1.0.2", Retrieved from: <http://palette-extender.en.softonic.com/symbian> on Nov. 6, 2008, Jan. 21, 2003, 2 pages.
"Parallax Scrolling", Retrieved from: <http://en.wikipedia.org/wiki/Parallax_scrolling> on May 5, 2009., May 4, 2009, 3 Pages.
"Push Notifications Overview for Windows Phone", Retrieved from: <http://msdn.microsoft.com/en-us/library/ff402558%28VS.92%29.aspx> on Sep. 30, 2010, Sep. 3, 2010, 1 page.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., Jul. 15, 2005, 5 Pages.
"Restriction Requirement", U.S. Appl. No. 13/118,265, Feb. 27, 2014, 7 pages.
"Restriction Requirement", U.S. Appl. No. 13/118,288, Mar. 4, 2014, 7 pages.
"Restriction Requirement", U.S. Appl. No. 13/658,694, Feb. 6, 2013, 6 pages.
"SecureMe-Anti-Theft Security Application for S60 3rd", Retrieved from: <http://www.killermobile.com/newsite/mobile-software/s60-applications/secureme-%11-anti%11theft-security-application-for-s60-3rd.htm> on Jun. 28, 2011, Dec. 15, 2008, 3 pages.

(56) References Cited

OTHER PUBLICATIONS

"Snap", Windows 7 Features—retrieved from <http://windows.microsoft.com/en-US/windows7/products/features/snap> on Sep. 23, 2011, 2 pages.
"Supplemental Notice of Allowance", U.S. Appl. No. 12/433,667, Aug. 1, 2013, 2 pages.
"Supplemental Notice of Allowance", U.S. Appl. No. 12/977,584, Sep. 16, 2013, 2 pages.
"Supplemental Notice of Allowance", U.S. Appl. No. 12/977,584, Oct. 11, 2013, 2 pages.
"Supplemental Notice of Allowance", U.S. Appl. No. 12/978,184, Feb. 25, 2014, 2 pages.
"Supplemental Notice of Allowance", U.S. Appl. No. 13/655,390, Sep. 19, 2013, 2 pages.
"Supplemental Notice of Allowance", U.S. Appl. No. 13/655,390, Jul. 25, 2013, 2 pages.
"Supplementary European Search Report", European Patent Application No. 10823883.3, Jul. 31, 2012, 3 pages.
"Switch between Windows of the Same App", Retrieved from <http://www.ntwind.com/software/vistaswitcher/instance-switcher.html> on Feb. 20, 2013, May 12, 2012, 2 pages.
"Symbian Applications", Retrieved from: <http://symbianfullversion.blogspot.com/2008_12_01_archive.html> on May 5, 2009., Jan. 2009, 51 Pages.
"The Map Screen", retrieved from <http://www.symbianos.org/whereamiusersguide> on Jun. 17, 2011, 3 pages.
"The Start Menu (overview)", retrieved from <http://web.archive.org/web/20101219151141/http://www.windows.microsoft.com/en-US/windows-vista/The-Start-menu-overview> on Feb. 12, 2013, Dec. 19, 2010, 5 pages.
"ThumbJot", Retrieved form <http://thumbjot.com/wp/?page_id=8>, 2008, 2 pages.
"Top 3 Task Switchers for Android", TechCredo—retrieved from <http://www.techcredo.com/android/top-3-task-switchers-for-android> on May 11, 2011, Mar. 9, 2011, 5 pages.
"Top Android App: Swipepad", Best Android Apps Review—retrieved from <http://www.bestandroidappsreview.com/2011/01/top-android-app-swipepad-launcher.html> on May 11, 2011, 4 pages.
"Touch Shell Free", Retrieved from: <http://www.pocketpcfreeware.mobi/download-touch-shell-free.html> on May 5, 2009., Feb. 23, 2009, 2 Pages.
"User Guide", retrieved from <http://wireframesketcher.com/help/help.html> on Jun. 17, 2011, 19 pages.
"Windows 8 Is Gorgeous, But Is It More Than Just a Shell? (Video)", retrieved from <http://techcrunch.com/2011/06/02/windows-8-gorgeous-shell-video/> on Jun. 20, 2011, Jun. 2, 2011, 6 pages.
"Windows Phone 7 (Push Notification)", retrieved from <http://unknownerror.net/2011-06/windows-phone-7-push-notification-36520> on Jul. 6, 2011, 4 pages.
"Windows Phone 7 Live Tiles", Retrieved from: <http://www.knowyourmobile.com/microsoft/windowsphone7/startscreen/640737/windows_phone_7_live_tiles.html> on May 11, 2011, Oct. 20, 2010, 3 pages.
"Winterface Review", Retrieved from: <http://www.mytodayscreen.com/winterface-review/> on Nov. 12, 2008, Jul. 9, 2008, 42 pages.
"Womma", Retrieved from: <http://www.womma.org/blog/links/wom-trends/> on May 5, 2009., 2007, 70 Pages.
"Working with Multiple Windows", MSOFFICE tutorial!—retrieved from <http://www.msoffice-tutorial.com/working-with-multiple-windows.php> on Sep. 23, 2011, 3 pages.
"You've Got Mail 1.4 Build", retrieved from <http://www.fileshome.com/Shows_Animation_Plays_Sound_Automatic_N . . . > on Jan. 6, 2010, Jun. 18, 2007, 2 pages.
"YUI 3: ScrollView [beta]", Retrieved from: <http://developer.yahoo.com/yui/3/scrollview/> on Sep. 28, 2010, 5 pages.
Aguilar, "How to Run Multiple Instances of the Same App in Mac OS X", Retrieved from <http://operating-systems.wonderhowto.com/how-to/run-multiple-instances-same-app-mac-os-x-0140144/> on Feb. 20, 2013, Jan. 1, 2013, 4 Pages.

Al "Droptiles—Metro Style Live Tiles Enabled Web 2.0 Dashboard", Retrieved from <http://oazabir.github.com/Droptiles/> on Mar. 5, 2013, Jul. 18, 2012, 7 pages.
Bates, "A Framework to Support Large-Scale Active Applications", University of Cambridge Computer Laboratory—Available at <http://citeseerx.ist.psu.edu/viewdoc/download?doi=10.1.1.48.1690&rep=rep1&type=pdf >, 1996, 8 pages.
Beiber, et al., "Screen Coverage: A Pen-Interaction Problem for PDA's and Touch Screen Computers", In Proceedings of ICWMC 2007, Mar. 2007, 6 pages.
Bjork, et al., "Redefining the Focus and Context of Focus+Context Visualizations", In Proceedings of INFOVIS 2000—Available at <http://www.johan.redstrom.se/papers/redefining.pdf>, Oct. 2000, 9 pages.
Blankenburg, "31 Days of Mango | Day #11: Live Tiles", Retrieved from <http://www.jeffblankenburg.com/2011/11/11/31-days-of-mango-day-11-live-tiles/> on Mar. 5, 2013, Nov. 11, 2011, 10 pages.
Bowes, et al., "Transparency for Item Highlighting", Faculty of Computing Science, Dalhousie University—Available at <http://torch.cs.dal.ca/~dearman/pubs/GI2003-bowes,dearman,perkins-paper.pdf>, 2003, 2 pages.
Bruzzese, "Using Windows 7, Managing and Monitoring Windows 7—Chapter 11", Que Publishing, May 5, 2010, 33 pages.
Buring, "User Interaction with Scatterplots on Small Screens—A Comparative Evaluation of Geometric-Semantic Zoom and Fisheye Distortion", IEEE Transactions on Visualization and Computer Graphics, vol. 12, Issue 5, Available at <http://citeseerx.ist.psu.edu/viewdoc/download?doi=10.1.1.134.4568&rep=rep1&type=pdf>, Sep. 2006, pp. 829-836.
Carrera, et al., "Conserving Disk Energy in Network Servers", available at <http://citeseerx.ist.psu.edu/viewdoc/download?doi=10.1.1.6.8301&rep=rep1&type=ps>, Nov. 2002, 15 pages.
Cawley, "How to Customise Your Windows Phone 7", Retrieved from: <http://www.brighthub.com/mobile/windows-mobile-platform/articles/95213.aspx> on May 10, 2011, Nov. 12, 2010, 3 pages.
Cawley, "Windows Phone 7 Customization Tips and Tricks", retrieved from <http://www.brighthub.com/mobile/windows-mobile-platform/articles/95213.aspx> on Jun. 20, 2011, May 16, 2011, 2 pages.
Cohen, et al., "Wang Tiles for Image and Texture Generation", In Proceedings of SIGGRAPH 2003—Available <http://research.microsoft.com/en-us/um/people/cohen/WangFinal.pdf>, 2003, 8 pages.
Crouch, "Smartphone Wars: Micron's Slide-to-Unlock Patent", Jan. 30, 2013, 2 pages.
Damien, "7 Ways to Supercharge Multitasking in Android", retrieved from <http://maketecheasier.com/7-ways-to-supercharge-multitasking-in-android/2011/01/22/> on May 11, 2011, Jan. 22, 2011, 5 pages.
Danish, "Win7sè Brings Mac-Like Screen Corners to Windows 7 & Windows 8", retrieved from <http://technomondo.com/2011/11/13/win7se-brings-mac-like-screen-corners-to-windows-7-windows8/> on Nov. 23, 2011, Nov. 13, 2011, 4 pages.
Davis "A WPF Custom Control for Zooming and Panning", Retrieved from: <http://www.codeproject.com/KB/WPF/zoomandpancontrol.aspx> on Sep. 28, 2010, Jun. 29, 2010, 21 pages.
Delimarsky, "Sending Tile Push Notifications on Windows Phone 7", retrieved from <http://mobile.dzone.com/articles/sending-tile-push> on May 10, 2011, Aug. 25, 2010, 2 pages.
Denoue, et al., "WebNC: Efficient Sharing of Web Applications", In Proceedings of WWW 2009—Available at <http://www.fxpal.com/publications/FXPAL-PR-09-495.pdf>, 2009, 2 pages.
Dixon, "Living in the Online Cloud: The T-Mobile G1 / Google Android Smartphone", Retrieved from <http://www.manifest-tech.com/media_pda/t-mobile_g1_android.htm>, Dec. 2008, 3 pages.
Dolcourt, "Webware", Retrieved from: <http://news.cnet.com/webware/?categoryId=2010> on May 5, 2009., 13 Pages.
Dunsmuir, "Selective Semantic Zoom of a Document Collection", Available at <http://www.cs.ubc.ca/~tmm/courses/533/projects/dustin/proposal.pdf>, Oct. 30, 2009, pp. 1-9.

(56) References Cited

OTHER PUBLICATIONS

Egan, "Modifying Live Tiles in a Background Process", Retrieved from <http://thesociablegeek.com/windows-8/livetiles/modifying-live-tiles-in-a-background-process/> on Mar. 5, 2013, Aug. 31, 2012, 24 pages.
Farrugia, et al., "Cell Phone Mini Challenge: Node-Link Animation Award Animating Multivariate Dynamic Social Networks", IEEE Symposium on Visual Analytics Science and Technology, Columbus, OH, USA, Oct. 21-23, 2008, Oct. 21, 2008, 2 pages.
Fisher, "Cool Discussion of Push Notifications—Toast and Tile—on Windows Phone", Retrieved from: <http://www.windowsphoneexpert.com/Connection/forums/p/4153/18399.aspx> on Sep. 29, 2010, May 3, 2010, 3 pages.
Gade, "Samsung Alias u740", Retrieved from: <http://www.mobiletechreview.com/phones/Samsung-U740.htm> on Nov. 20, 2008, Mar. 14, 2007, 6 pages.
Gao, "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, Feb. 2007, pp. 1-42.
Gralla, "Windows XP Hacks, Chapter 13—Hardware Hacks", O'Reilly Publishing, Feb. 23, 2005, 25 pages.
Ha, et al., "SIMKEYS: An Efficient Keypad Configuration for Mobile Communications", Retrieved from: < http://ieeexplore.ieee.org/stamp/stamp.jsp?arnumber=01362557.> on Dec. 17, 2008, Nov. 2004, 7 Pages.
Harrison, "Symbian OS C++ for Mobile Phones vol. 3", Retrieved from: <http://www.amazon.co.uk/Symbian-OS-Mobile-Phones-Press/dp/productdescription/0470066415> on Oct. 23, 2008, Symbian Press, Jun. 16, 2003, 4 pages.
Hickey, "Google Android has Landed; T-Mobile, HTC Unveil G1", Retrieved from: <http://www.crn.com/retail/210603348> on Nov. 26, 2008., Sep. 23, 2008, 4 pages.
Horowitz, "Installing and Tweaking Process Explorer part 2", Retrieved from <http://web.archive.org/web/20110510093838/http://blogs.computerworld.com/16165/installing_and_tweaking_process_explorer_part_2> on Mar. 12, 2013, May 23, 2010, 7 pages.
Janecek, et al., "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf >, Feb. 15, 2005, pp. 1-15.
Kcholi, "Windows CE .NET Interprocess Communication", Retrieved from http://msdn.microsoft.com/en-us/library/ms836784.aspx on Jul. 17, 2008., Jan. 2004, 15 Pages.
Keranen, "OpenGL-based User Interface Toolkit for Symbian Mobile Devices", Master of Science Thesis, Tamere University of Technology, Department of Information Technology, Apr. 6, 2005, 88 pages.
Kurdi, "Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, Jan. 19, 2010, 6 pages.
Kurdi, "WinSplit Revolution", Retrieved from <http://www.freewaregenius.com/winsplit-revolution/> on Jun. 30, 2013, Aug. 22, 2007, 4 Pages.
La, "Parallax Gallery", Available at <http://webdesignerwall.comtutorials/parallax-gallery/comment-page-1>, Apr. 25, 2008, 16 pages.
Livingston, et al., "Windows 95 Secrets", 1995, I DG Books Worldwide, 3rd Edition, 1995, pp. 121-127.
Long, "Gmail Manager 0.6", Retrieved from: <https://addons.mozilla.org/en-US/firefox/addon/1320/> on Sep. 29, 2010, Jan. 27, 2010, 4 pages.
Mann, et al., "Spectrum Analysis of Motion Parallax in a 3D Cluttered Scene and Application to Egomotion", Journal of the Optical Society of America A, vol. 22, No. 9—Available at <http://www.cs.uwaterloo.ca/~mannr/snow/josa-mann-langer.pdf>, Sep. 2005, pp. 1717-1731.
Mantia, "Multitasking: What Does It Mean?", retrieved from <http://mantia.me/blog/multitasking/> on Sep. 23, 2011, 3 pages.
Mao, "Comments of Verizon Wireless Messaging Services, LLC", Retrieved from: http://www.ntia.doc.gov/osmhome/warnings/comments/verizon.htm on May 6, 2009., Aug. 18, 2000, 5 Pages.
Marie, "MacBook Trackpad Four Fingers Swipe Left/Right to Switch Applications", MacBook Junkie—retrieved from <http://www.macbookjunkie.com/macbook-trackpadfour-fingers-swipe-left-right-to-switch-applications/> on May 11, 2011, Nov. 13, 2010, 4 pages.
Mazo, "How to Switch Applications and Multitask on the Galaxy S3", Retrieved from <http://www.androidcentral.com/how-switch-applications-and-multitask-samsung-galaxy-s3> on Feb. 18, 2013, Jul. 17, 2012, 7 pages.
Mei, et al., "Probabilistic Multimodality Fusion for Event Based Home Photo Clustering", Retrieved from: <http://ieeexplore.ieee.org//stamp/stamp.jsp?tp=&arnumber=04036960.>, Dec. 26, 2006, pp. 1757-1760.
Michaluk, "Using the Application Switcher and Closing Apps When Finished to Maximize your BlackBerry Efficiency", Retrieved from <http://crackberry.com/using-application-switcher-and-closing-apps-when-finished-maximize-your-blackberry-efficiency> on Feb. 19, 2013, Aug. 17, 2009, 14 pages.
Nordgren, "Development of a Touch Screen Interface for Scania Interactor", Master's Thesis in C—Available at <http://www.cs.umu.se/education/examina/Rapporter/PederNordgren.pdf>omputing Science, UMEA University, Apr. 10, 2007, pp. 1-59.
Oliver, "Potential iPhone Usability and Interface Improvements", Retrieved from: <http://www.appleinsider.com/articles/08/09/18/potential_iphone_usability_and_interface_improvements.html> on Nov. 12, 2008, AppleInsider,Sep. 18, 2008, 4 pages.
Oryl, "Review: Asus P527 Smartphone for North America", Retrieved from: <http://www.mobileburn.com/review.jsp?Id=4257> on Dec. 17, 2008., Mar. 5, 2008, 1 Page.
Padilla, "Palm Treo 750 Cell Phone Review—Hardware", Retrieved from: <http://www.wirelessinfo.com/content/palm-Treo-750-Cell-Phone-Review/Hardware.htm> on Dec. 11, 2008., Mar. 17, 2007, 4 Pages.
Paul, "Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, Aug. 2010, 3 pages.
Pendharkar, "Fluid Home Screen for Mobile Phones", Helsinki Metropolia University of Applied Sciences, Master of Engineering, Information Technology, Thesis, Available at <http://theseus17-kk.lib.helsinki.fi/bitstream/handle/10024/46481/FinalThesis3.pdf?sequence=1/>,Apr. 12, 2012, 48 pages.
Perry, "Teach Yourself Windows 95 in 24 Hours", 1997, Sams Publishing, 2nd Edition, 1997, pp. 193-198.
Raghaven, et al., "Model Based Estimation and Verification of Mobile Device Performance", Available at http://alumni.cs.ucsb.edu/~raimisl/emsoft04_12.pdf., Sep. 27-29, 2004, 10 Pages.
Rathbone, "Windows Phone 7 Live Tile Schedules—How to Execute Instant Live Tile Updates", Retrieved from <http://www.diaryofaninja.com/blog/2011/04/03/windows-phone-7-live-tile-schedules-ndash-executing-instant-live-tile-updates> on Mar. 11, 2013, Apr. 3, 2011, 8 pages.
Ray, "Microsoft Re-Tiles Mobile Platform for Windows 7 Era", retrieved from <http://www.theregister.co.uk/2010/02/15/windows_phone_7_series/> on May 11, 2011, Feb. 15, 2010, 2 pages.
Reed, "Microsoft Demos Windows Mobile 6.1 at CTIA", Retrieved from: <http://www.networkworld.com/news/2008/040208-ctia-microsoft-windows-mobile.html> on Jul. 18, 2008, Apr. 2, 2008, 1 page.
Remond, "Mobile Marketing Solutions", Retrieved from: <http://www.mobilemarketingmagazine.co.uk/mobile_social_networking/> on May 5, 2009., Apr. 28, 2009, 16 Pages.
Rice, et al., "A System for Searching Sound Palettes", Proceedings of the Eleventh Biennial Symposium on Arts and Technology,, Available at <http://www.comparisonics.com/FindSoundsPalettePaper.pdf>,Feb. 2008, 6 pages.
Ritchie, "iOS 4 features: iPod touch Wi-Fi stays connected when asleep—iPhone too?", Retrieved from: <http://www.goip.com/

(56) References Cited

OTHER PUBLICATIONS

2010/06/ios-4-features-ipod-touch-wi-fi-stays-connected-when-asleep-%E2%80%94-iphone-too/> on Sep. 30, 2010, Jun. 14, 2010, 2 pages.

Ritscher, "Using Surface APIs in your WPF application—Part 1", Retrieved from: <http://blog.wpfwonderland.com/2009/06/30/using-surface-apis-in-your-wpf-application/> on Sep. 28, 2010, Jun. 30, 2009, 7 pages.

Roberts, "Touching and Gesturing on the iPhone", Available at <http://www.sitepen.com/blog/2008/07/10/touching-and-gesturing-on-the-iphone/comments-pare-1>, Jul. 10, 2008, 16 pages.

Sandoval, "A development platform and execution environment for mobile applications", Universidad Autónoma de Baja California, School of Chemical Sciences and Engineering, Available at <http://citeseerx.ist.psu.edu/viewdoc/download?doi=10.1.1.86.7989&rep=rep1&type=pdf>,2004, 18 pages.

Singh, et al., "CINEMA: Columbia InterNet Extensible Multimedia Architecture", Available at <http://www1.cs.columbia.edu/~library/TR-repository/reports/reports-2002/cucs-011-02.pdf>, Sep. 3, 2002, 83 Pages.

Smith, et al., "GroupBar: The TaskBar Evolved", Proceedings of OZCHI 2003—Available at <http://research.microsoft.com/pubs/64316/ozchi2003-groupbar.pdf>, Nov. 2003, pp. 1-10.

Spradlin, "Switcher Provides an Incredible Gesture-based App Switching Tool", Retrieved from <http://www.androidpolice.com/2012/07/09/switcher-proof-of-concept-hits-the-play-store-providing-an-incredible-gesture-based-app-switching-tool/> on Feb. 18, 2013, Jul. 9, 2012, 7 pages.

Stebih, "Windows 8 Mouse and Keyboard Commands", retrieved from <http://www.helpdesktv.ca/windows/windows-8-mouse-and-keyboard-commands.html> on Nov. 23, 2011, Sep. 21, 2011, 5 pages.

Steinicke, et al., "Multi-Touching 3D Data: Towards Direct Interaction in Stereoscopic Display Environments coupled with Mobile Devices", Advanced Visual Interfaces (AVI) Workshop on Designing Multi-Touch Interaction Techniques for Coupled Public, Available at <http://viscg.uni-muenster.de/publications/2008/SHSK08/ppd-workshop.-pdf.>,Jun. 15, 2008, 4 Pages.

Suror, "PocketShield-New Screenlock App for the HTC Diamond and Pro", Retrieved from: <http://wmpoweruser.com/?tag=htc-touch-diamond> on Jun. 28, 2011, Oct. 23, 2008, 2 pages.

Terpstra, "Beta Beat: Grape, a New Way to Manage Your Desktop Clutter", Retrieved from: Beta Beat: Grape, a New Way to Manage Your Desktop Clutter on Jun. 28, 2011, Apr. 14, 2009, 4 pages.

Vallerio, et al., "Energy-Efficient Graphical User Interface Design", Retrieved from: <http://www.cc.gatech.edu/classes/AY2007/cs7470_fall/zhong-energy-efficient-user-interface.pdf>, Jun. 10, 2004, pp. 1-13.

Vermeulen, "BlackBerry PlayBook Hands-on", retrieved from <http://mybroadband.co.za/news/gadgets/20104-BlackBerry-PlayBook-hands-.html> on May 11, 2011, May 8, 2011, 4 pages.

Viticci, "Growl 1.3 to Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011, Jul. 6, 2011, 6 pages.

Vornberger, "Bluetile", Retrieved from: <http://www.bluetile.org> on Sep. 29, 2010, 5 pages.

Webster, "VsNotepad: An Improved Way to Jot Down on Windows Mobile", Retrieved from <http://pocketnow.com/index.php/index.php?a=portal_detail&t=news&id=7424>, May 19, 2009, 2 pages.

Wilson, "How the iPhone Works", Retrieved from: <http://electronics.howstuffworks.com/iphone2.htm> on Apr. 24, 2009, Jan. 2007, 9 pages.

Wilson, "Robust Computer Vision-Based Detection of Pinching for One and Two-Handed Gesture Input", In Proceedings of UIST 2006—Available at <http://research.microsoft.com/en-us/um/people/awilson/publications/wilsonuist2006/uist%202006%20taffi.pdf>, Oct. 2006, 4 pages.

Wobbrock, et al., "User-Defined Gestures for Surface Computing", CHI 2009, Apr. 4-9, 2009, Boston, MA—available at <http://faculty.washington.edu/wobbrock/pubs/chi-09.2.pdf>, Apr. 4, 2009, 10 pages.

Wu, et al., "Achieving a Superior Ownership Experience in Manageability and Quality for Siebel CRM", available at <http://www.oracle.com/us/products/enterprise-manager/superior-exp-for-siebel-crm-068962.pdf>, Aug. 2008, 25 pages.

Wyatt, "/Flash/the art of parallax scrolling", .net Magazine, Aug. 1, 2007, pp. 74-76.

Yang, et al., "Dual-Surface Input: Augmenting One-Handed Interaction with Coordinated Front and Behind-the-Screen Input", Proceedings: MobileHCI '09, Sep. 15-18, 2009, Bonn, Germany—retrieved from <http://www.cs.ualberta.ca/~wfb/publications/C-2009-MobileHCI-Yang.pdf>, Sep. 18, 2009, 10 pages.

Yang, et al., "Semantic Photo Album Based on MPEG-4 Compatible Application Format", Retrieved from: <http://ieeexplore.ieee.org/stamp/stamp.jsp?arnumber=04146254.>, 2007, 2 Pages.

"Google Apps versus Office 365: Audit Logs", Retrieved From: <http://www.linkgard.com/blog/google-apps/google-apps-vs-office-365-audit-logs.html> Mar. 29, 2014, Jul. 23, 2013, 8 pages.

"Heatmap", Retrieved From: <https://support.google.com/drive/answer/91599?hl=en> Mar. 29, 2014, 2 Pages.

"Non-Final Office Action", U.S. Appl. No. 13/118,292, Jun. 6, 2014, 25 pages.

"QNX Photon microGUI Windowing System", Retrieved from: <http://www.qnx.com/developers/docs/6.5.0/index.jsp?topic=%2Fcom.qnx.doc.photon_prog_guide%2Fdragndrop.html> on Apr. 6, 2014, 22 pages.

"Tiles and Notifications for Windows Phone", Retrieved From: <http://msdn.microsoft.com/en-us/library/windowsphone/develop/jj662933.aspx> Apr. 1, 2014, Mar. 11, 2014, 2 Pages.

Baweja, "OpenHeatMap: Create Heat Maps for Excel Spreadsheets With Geo Data", Retrieved From: <http://www.makeuseof.com/tag/openheatmap-create-heat-maps/> Mar. 29, 2014, Jul. 24, 2010, 4 Pages.

Cohen, et al., "Automatic Strategies in the Siemens RTL Tiled Window Manager", In Proceedings: The 2nd IEEE Conference on Computer Workstations, Mar. 7, 1988, pp. 111-119.

Kandogan, et al., "Elastic Windows: Improved Spatial Layout and Rapid Multiple Window Operations", In Proceedings of the Workshop on Advanced Visual Interfaces, May 27, 1996, 10 Pages.

Matejka, et al., "Patina: Dynamic Heatmaps for Visualizing Application Usage", In Proceedings: The SIGCHI Conference on Human Factors in Computing Systems, Autodesk Research, Toronto, Ontario, Canada,Apr. 27, 2013, pp. 3227-3236.

Simeone, "A Cross-Device Drag-and-Drop Technique", In Proceedings of MUM 2013, Dec. 2013, 4 pages.

Ueland, "25 Apps for Dropbox", Retrieved from: <http://www.practicalecommerce.com/articles/3984-25-Apps-for-Dropbox> on Apr. 6, 2014, Apr. 15, 2013, 10 pages.

"Extended European Search Report", EP Application No. 11866553.8, Dec. 9, 2014, 7 pages.

"Extended European Search Report", EP Application No. 11867033.0, Nov. 27, 2014, 8 pages.

"Final Office Action", U.S. Appl. No. 13/118,292, Dec. 5, 2014, 30 pages.

"International Search Report and Written Opinion", Application No. PCT/CN2014/074793, Sep. 30, 2014, 15 pages.

"Non-Final Office Action", U.S. Appl. No. 14/089,149, Nov. 3, 2014, 8 pages.

"Notice of Allowance", U.S. Appl. No. 14/089,149, Dec. 5, 2014, 4 pages.

"Corrected Notice of Allowance", U.S. Appl. No. 14/089,149, Feb. 20, 2015, 2 pages.

"Foreign Office Action", CN Application No. 201180071186.4, Jan. 20, 2015, 8 pages.

"International Search Report and Written Opinion", Application No. PCT/CN2014/074788, Dec. 30, 2014, 12 pages.

"International Search Report and Written Opinion", Application No. PCT/CN2014/074825, Jan. 5, 2015, 15 pages.

"International Search Report and Written Opinion", Application No. PCT/CN2014/074783, Dec. 31, 2014, 15 pages.

"Supplemental Notice of Allowance", U.S. Appl. No. 14/089,149, Mar. 20, 2015, 2 pages.

"Foreign Office Action", CN Application No. 201180071186.4, Jun. 2, 2015, 7 pages.

\* cited by examiner

1100

1102
Enter a mode to close an application responsive to recognition of one or more inputs to select an application displayed in a display environment by the computing device, the mode operable to change a display characteristic of the application and cause the display of the application to follow subsequent movement described by an input device used to select the application as defined by the inputs

1104
Exit the mode to close the application responsive to detection that the one or more inputs have ceased

Fig. 11

CLOSING APPLICATIONS

BACKGROUND

Users have access to computing devices that may assume a wide variety of configurations. For example, the first computing devices that were traditionally available to common users were configured as desktop personal computers. Users typically interacted with these first computing devices using a keyboard and later a mouse to view data on a monitor.

Computing devices continued to evolve as users desired to interact with the devices in an increasing variety of circumstances. One such example was mobile phones that evolved from basic telephone functionality to the ability to run applications. Another such example is a slate computer, which may also be referred to as a tablet. Both of these examples are configured to be held by a user during interaction and thus techniques were developed to address this configuration.

Because of the different configurations of the computing devices, however, a variety of different techniques may be employed for interaction. Thus, even typical users may be confronted with a wide range a different techniques, even to utilize matching functionality of the devices, which could lead to user frustration and even cause the users to forgo use of computing devices having the different configurations due to user confusion. Further, these conventional techniques could be intrusive when employed by the different configurations, such as convention techniques that were used to close an application.

SUMMARY

Application closing techniques are described. In one or more implementations, a computing device recognizes an input as involving selection of an application displayed in a display environment by the computing device and subsequent movement of a point of the selection toward an edge of the display environment. Responsive to the recognizing of the input, the selected application is closed by the computing device.

In one or more implementations, a computing device recognizes a selection input as initiating selection of an application displayed in a display environment of the computing device, the selection made at a portion of the application displayed proximal to a first edge of the display environment. Responsive to the recognition of the selection input, a display characteristic of the application is changed to indicate the selection of the application. The display of the application having the changed display characteristic is also caused to follow subsequent movement of the selection as indicated by one or more inputs. A closing input is recognized through the subsequent movement as crossing a threshold defined in relation to a second edge of the display environment. Responsive to the recognizing of the closing input, a further change in one or more display characteristics of the application is caused to indicate availability of an operation to initiate closing of the application.

In one or more implementations, a computing device enters a mode to close an application responsive to recognition of one or more inputs to select an application displayed in a display environment by the computing device, the mode operable to change a display characteristic of the application and cause the display of the application to follow subsequent movement described by an input device used to select the application. The computing device exits the mode to close the application responsive to detection that the one or more inputs have ceased.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 11 is a flow diagram depicting a procedure in an example implementation in which a mode is entered that is usable to close one or more applications.

DETAILED DESCRIPTION

Overview

The diversity of computing devices with which a user interacts even in a typical day is growing rapidly. However, conventional techniques via which a user interacted with the devices were often optimized for these configurations. Thus, different techniques could be employed by different computing device configurations, even to access matching functionality. Additionally, development of new configurations could confound users due to the new ways in which a user could interact with the device, which could even result in a user forgoing interaction with unfamiliar device configurations.

Application closing techniques are described. In one or more implementations, techniques are described in which a user may cause a computing device to close one or more applications in an intuitive manner. This may include recognition of selection of the application by a user, such as by selecting a top edge of the application as displayed in a display environment using a cursor control device, a finger of a user's hand using touchscreen functionality, and so forth. Once selected, a point at which the display of the application was selected (e.g., a cursor or point of contact) may then be moved toward an edge of the display environment, such as a bottom edge implemented by one or more display devices.

The computing device, e.g., through execution of an operating system of the computing device, may then recognize an intent of the user to close the application and initiate this process. In one or more implementations, animations and display characteristics may be utilized to provide user feedback, such as to indicate selection of the application, availability of the close operation when the subsequent movement has reached a defined threshold, and so on. In this way, a user is provided with an intuitive technique to close applications that may be leveraged in a variety of different computing environments, examples of which are described in relation to FIG. 12.

In the following discussion, an example environment is first described that may employ the application closing techniques described herein. Example procedures are then described which may be performed in the example environment as well as other environments. Consequently, performance of the example procedures is not limited to the example environment and the example environment is not limited to performance of the example procedures.

Example Environment

Figure 1:
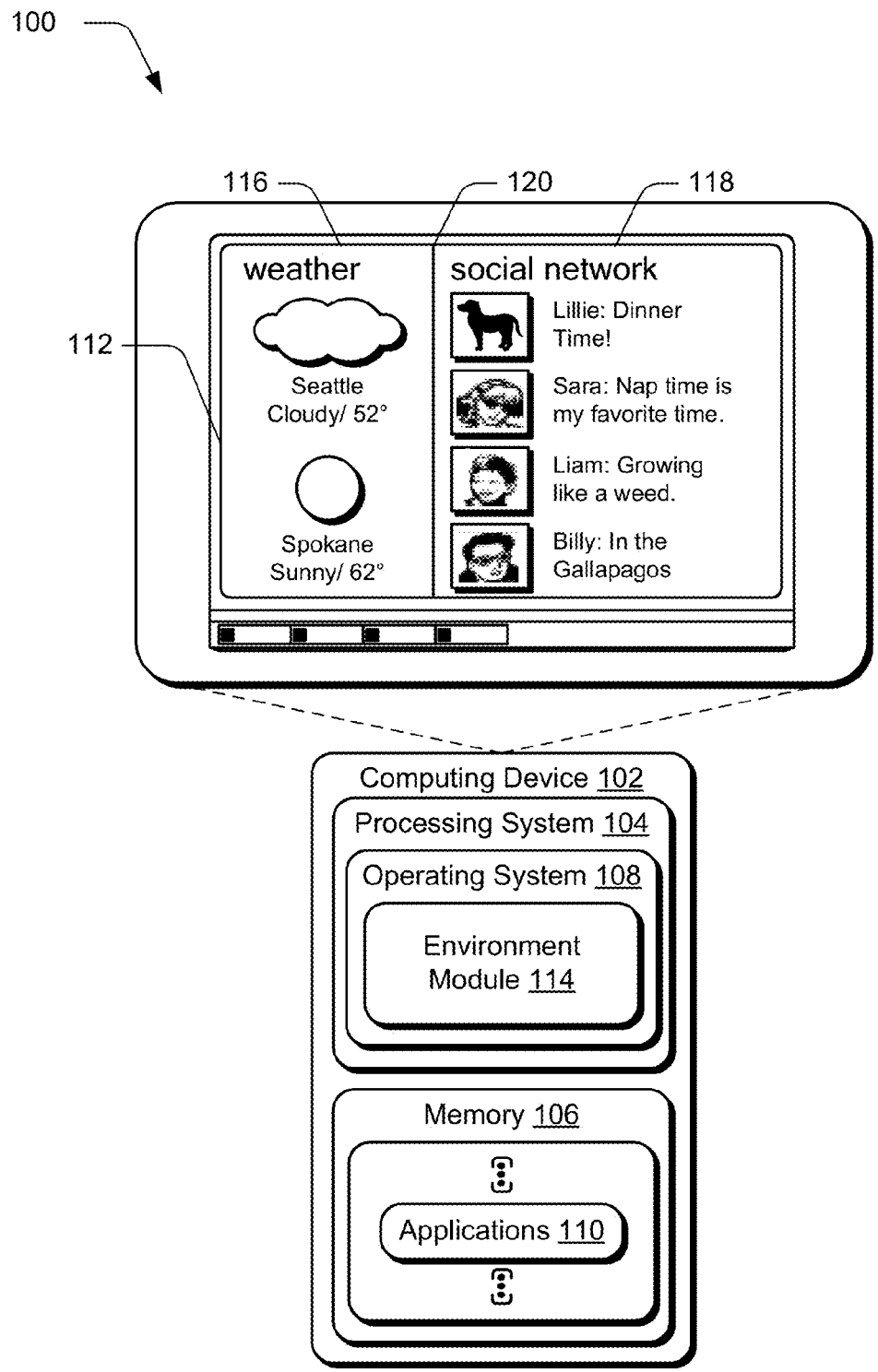
FIG. 1 is an illustration of an environment in an example implementation that is operable to implement application closing techniques described herein.

FIG. 1 is an illustration of an environment 100 in an example implementation that is operable to employ application closing techniques described herein. The illustrated environment 100 includes a computing device 102 having a processing system 104 and a computer-readable storage medium that is illustrated as a memory 106 although other confirmations are also contemplated as further described below.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles) as further described in relation to FIG. 12. Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 is further illustrated as including an operating system 108. The operating system 108 is configured to abstract underlying functionality of the computing device 102 to applications 110 that are executable on the computing device 102. For example, the operating system 108 may abstract the processing system 104, memory 106, network, and/or display device 112 functionality of the computing device 102 such that the applications 110 may be written without knowing "how" this underlying functionality is implemented. The application 110, for instance, may provide data to the operating system 108 to be rendered and displayed by the display device 112 without understanding how this rendering will be performed. The operating system 108 may also represent a variety of other functionality, such as to manage a file system and user interface that is navigable by a user of the computing device 102.

The operating system 108 is also illustrated as including an environment module 114 which is representative of functionality of the computing device 102 to provide an environment via which a user may interact with the applications 110 and other data of the computing device 102, both local to the device as well as remotely via a network. A variety of different environments may be supported by the environment module 114, which may be configured to accept inputs to interact with the operating system 108 and applications 110 of the computing device 102 to access functionality of the computing device 102, such as the abstracted functionality described above.

One such environment is referred to as an immersive environment which may be configured to support interaction with the applications 110 with little to no window frame. Additionally, the immersive environment may support interaction with the applications 110 without requiring the user to manage a corresponding window frame's layout, primacy of the window with respect to other windows (e.g., whether a window is active, in front of behind other windows, an order of the windows, and so on). Although illustrated as part of the operating system 108, the environment module 114 may be implemented in a variety of other ways, such as a stand-alone module, remotely via a network, and so forth.

In one or more implementations, the immersive environment of the operating system 108 is configured such that it is not closeable or capable of being uninstalled apart from the operating system 108. Additionally, the immersive environment may be configured to consume a significant portion of an available display area of the display device 112. A user may interact with the immersive environment in a variety of ways, such as via a cursor control device, using one or more gestures involving a touch input, using speech recognition, capture using one or more depth-sensing cameras, and so on. Thus, the environment module 114 may manage the immersive environment in which content of applications 110 may be presented and the presentation may be performed without requiring a user to manage size, location, primacy, and so on of windows used to display the content of the applications 110.

For example, as shown on a user interface displayed by the display device 112, a user interface is shown that is configured to display data 116, 118 from two applications in a "docked" configuration. In this example, both of the applications that correspond to the data are enabled to actively execute by the computing device 102 while execution is suspended for other of the applications 110 that do not currently display data. A gutter 120 is disposed between the displays of the data 116, 118 that may be moveable to change an amount of display area consumed by applications on the display device 112, respectively.

The immersive environment may support a wide variety of functionality to provide an immersive experience for a user to access the applications 110. In the following discussion, this functionality is discussed in relation to leveraging these techniques to close an application. It should be readily apparent, however, that these techniques may be employed for managing interaction in other environments and/or with the applications 110 themselves without departing from the spirit and scope thereof For example, the environment module 114 may also be configured to support a desktop environment. The desktop environment is representative of another configuration of a user interface output by the operating system 108 when in this example is to interact with the applications 110 and other data. For example, the desktop environment may be configured to present applications and corresponding data through windows having frames. These frames may provide controls through which a user may interact with an application as well as controls enabling a user to move and size the window. The desktop environment may also support techniques to navigate through a hierarchical file structure through the use of folders and represent the data and applications through use of icons. In one or more implementations, the desktop environment may also be utilized to access application s 110 that are configured specifically for interaction via the desktop environment and not configured for access via the immersive shell 116, although other implementation are also contemplated.

Figure 2:
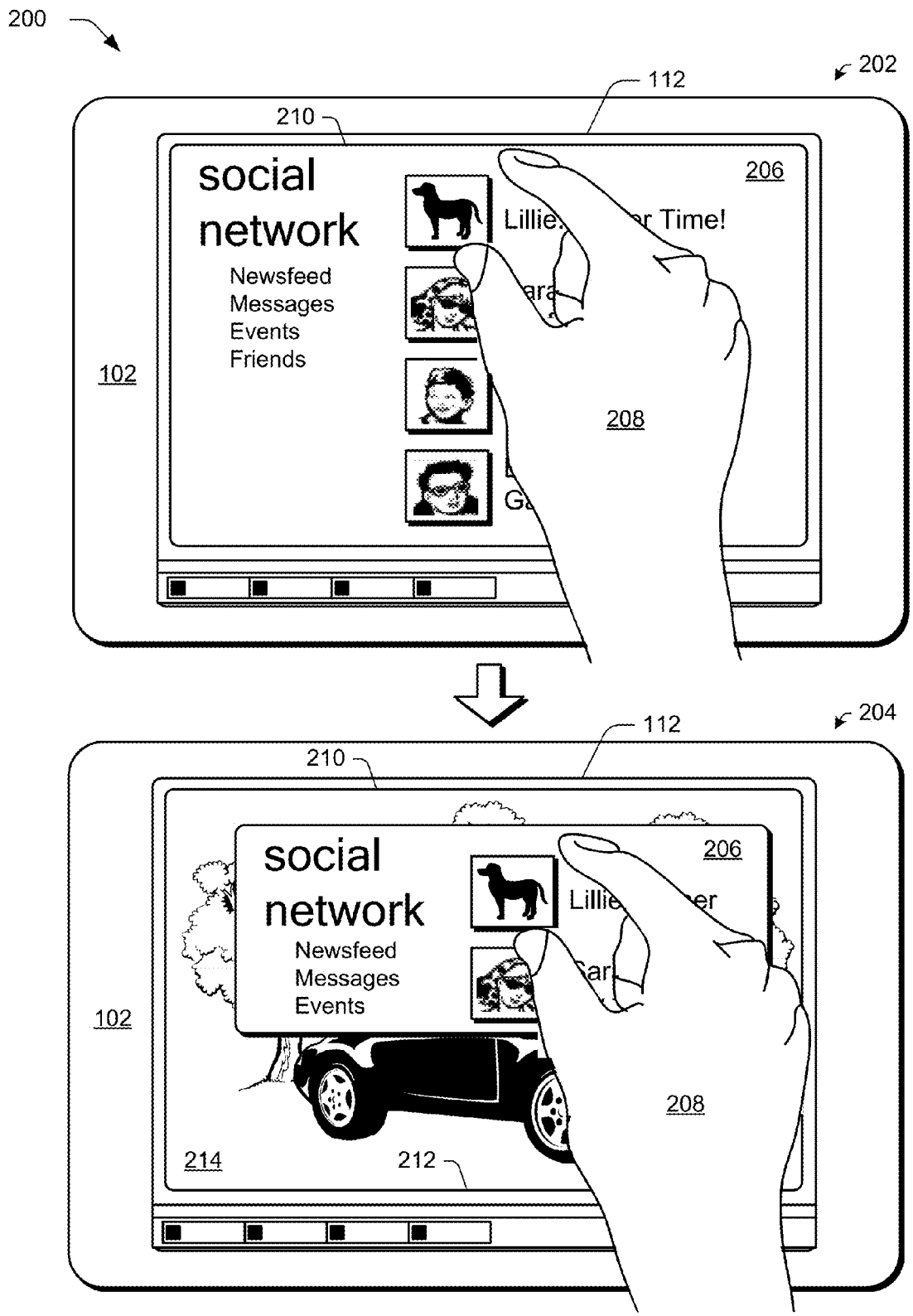
FIG. 2 illustrates a system in an example implementation of computing device of FIG. 1 as supporting selection of an application in a display environment.

Thus, it should be readily apparent that the techniques described to close applications herein may be supported in a wide range of environments, such as an immersive environment, a desktop environment, or other environment as further described in relation to FIG. 2.

Further, these techniques are not limited to inputs provided by a user. For example, the operating system 108 may incorporate a process lifetime manager (PLM) that is configured to automatically manage whether applications 110 are actively executed, suspended (e.g., frozen—still open but not consuming processing system 104 resources), or terminated (e.g., closed). As applications 110 transition between these parts of the "application lifecycle," the application may receive two events—visibility and suspension—that indicate whether the application 110 is "visible" on-screen and/or whether the application 110 is about to become "suspended." These events help to make the application 110 aware as to what to expect next, which may be used to indicate to the application 110 to save certain types of data. Accordingly, the environment module 114 may be configured to ensure that the applications 110 proceed through the typical "application lifecycle" and therefore receives these same events when closed. In one or more implementations, this is different than functionality employed by a task manager to "kill" (e.g., stop execution) of an application, which does not involve sending events to the application 110. The result of closing an app through the typical "application lifecycle" is that the application 110 is able to save user data and exit gracefully.

Generally, any of the functions described herein can be implemented using software, firmware, hardware (e.g., fixed logic circuitry), or a combination of these implementations. The terms "module," "functionality," and "engine" as used herein generally represent software, firmware, hardware, or a combination thereof. In the case of a software implementation, the module, functionality, or engine represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

FIG. 2 illustrates a system 200 in an example implementation of the computing device 102 of FIG. 1 as supporting selection of application in a display environment. The system 200 is illustrated as including first and second stages 202, 204. At the first stage 202, the computing device 102 is illustrated as outputting a user interface 206 of a social network application in an immersive environment and displaying the user interface 206 on a display device, although other environments are contemplated as previously described. Further, it should be noted that although a display environment implemented using a single display device is shown, it should be readily apparent that a display environment may leverage a plurality of display devices without departing from the spirit and scope thereof.

A finger of the user's hand 106 is illustrated in the first stage as selecting a portion of a display of the application that is near a top edge 210 of a display environment. The selection may be detected using touchscreen functionality of the display device 112, such as to contact the display device 112. A variety of other examples are also contemplated, such as through positioning of a cursor through use of a cursor control device near the top edge 210 and then performing a "click and hold" in which a button of the cursor control device is "held down."

As shown in the second stage 204 of FIG. 2, the point at which the application was selected is then moved away from the top edge 210 and toward a bottom edge 212. In response to this movement the display of the application is configured to follow this subsequent movement of the selection of the application. Further, display characteristics of the application may be changed to indicate the selection, such as lessening an amount of display area of the display environment consumed by the display of the application, thereby exposing a background 214 of the display environment, e.g., a background utilized by the operating system 108. Other characteristics are also contemplated, such as changing a transparency of the display, color, and so forth. Thus, these characteristics may be used to give feedback to the user regarding selection of the application. This selection may then be used as a basis to manage how and if the application is displayed, as further described in relation to the following figure.

Figure 3:
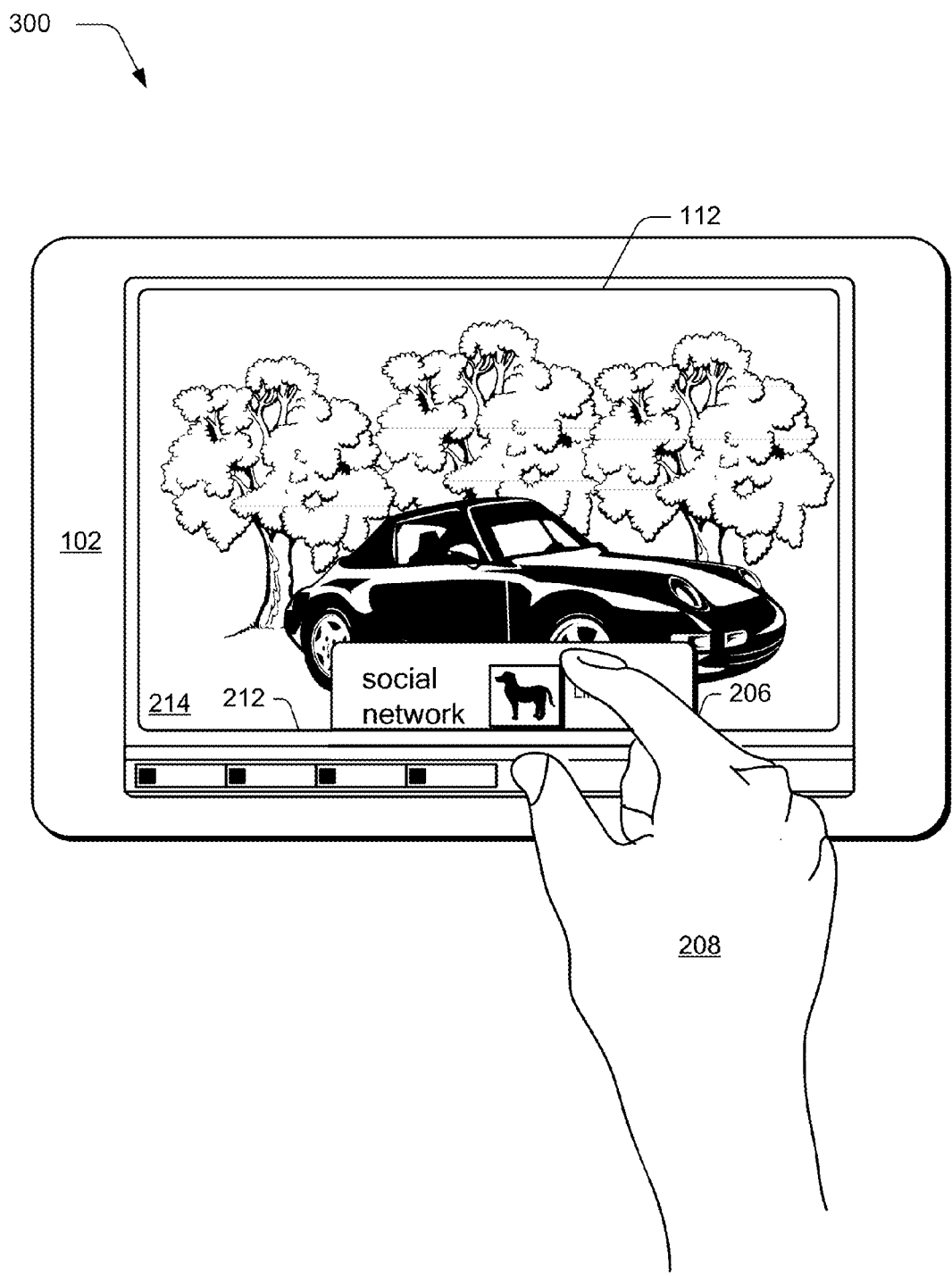
FIG. 3 depicts a system in an example implementation in which a computing device indicates availability of an operation to close the application of FIG. 2.

FIG. 3 depicts a system 300 in an example implementation in which a computing device indicates availability of an operation to close the application of FIG. 2. In this illustration, subsequent movement of the finger of the user's hand has continued toward the bottom edge 212 of the display environment.

Once movement past a threshold has been detected by the environment module 114, the environment module 114 may again cause display characteristics of the display of the application to change to indicate availability of a close operation. As before, this may include changing a size as illustrated, transparency, color, a "speed bump" in which the movement of the selected display of the application is slowed to indicate crossing of the threshold, and so on of the display of the application. Thus, at this point a user is made aware of the availability of the close operation and may then choose to do so as further described in relation to the following figure.

Figure 4:
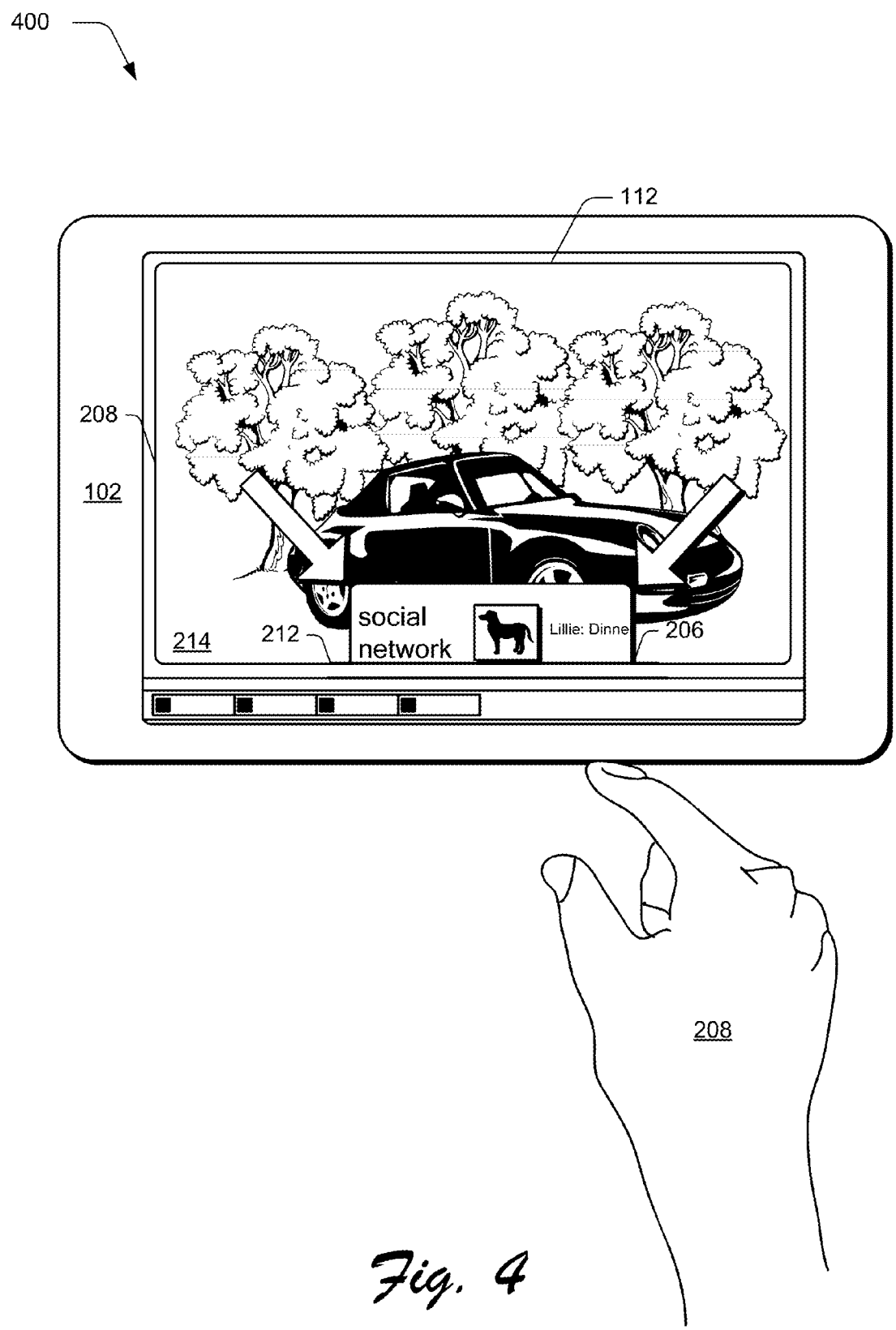
FIG. 4 depicts a system in an example implementation in which a user has initiated the closing of an application.

FIG. 4 depicts a system 400 in an example implementation in which a user has initiated the closing of an application. In this example, a user has lifted a finger of the user's hand 208 away from the display device 112. This causes the environment module 114 to exit the selection mode in which the user could reposition the display of the application. Further, because this selection occurred while the display of the application indicated availability of the close operation (due to passing of the threshold), the environment module 114 may initiate the operation to close the application. The may include removing the application from availability for execution, such that if execution was desired the application would first be reloaded by the operating system 108.

The close operation may be accompanied by one or more animations or other display techniques to indicate that the operation has been initiated to provide feedback to the user. This may include further shrinking and movement of the display of the application "off" the display device 112 as indicated by the arrows in FIG. 4. In this example, a user initiated the operation to close the application. The environment module 114 may also include functionality such that a user may cease initiation of this operation, of further described in relation to the following figure.

Figure 5:
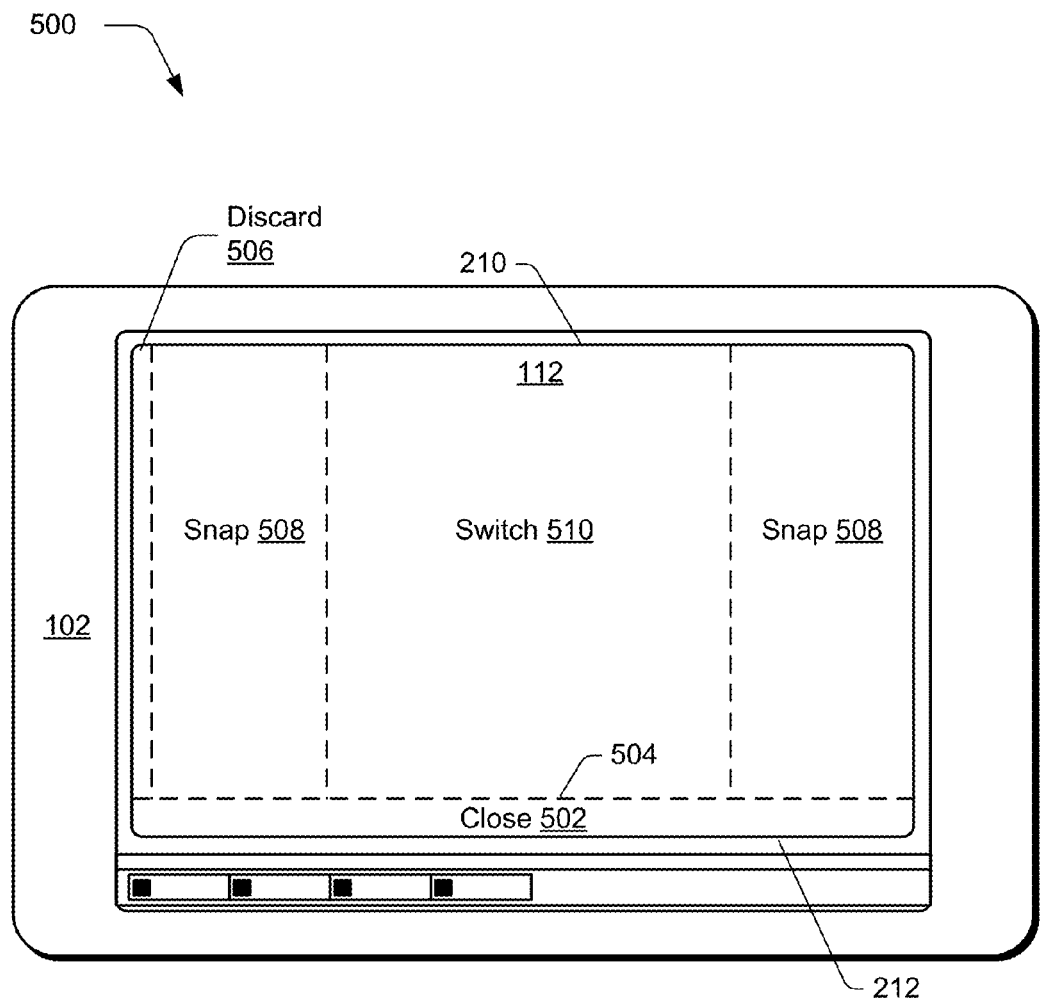
FIG. 5 is an illustration of a system in an example implementation showing areas of a display environment defined by thresholds to perform different actions after selection of an application as shown in FIG. 2.

FIG. 5 is an illustration of a system 500 in an example implementation showing areas of a display environment defined by thresholds to perform different actions after selection of an application as shown in FIG. 2. A close 502 region is shown as defined between a threshold 504 and a bottom edge 212 of the display environment. In this example, the threshold 504 is defined statically, e.g., at a defined distance from the bottom edge 212, such as for a gesture recognized using touch functionality of the display device 112. Other examples are also contemplated, such as a dynamic threshold defined as a percentage of movement between edges (e.g., the top and bottom edges 210, 212), such as twenty five percent for movement input using a cursor control device.

Thus, the close 502 region may be used to define "when" the close operation is available for an application that is "moved within" the region. This may include changing display characteristics to indicate availability as described in relation to FIG. 3.

Use of regions may also be used to allow a user to exit this mode, such as in an instance in which a user reconsiders, inadvertently entered the mode the close the application, and so on. For example, once moving into the close 502 region and upon receiving feedback that the close operation is available through the change in display characteristics, the user may reconsider. Accordingly, the user may then move a point of contact (e.g., a finger of the user's hand 208) back outside of the close 502 region. Accordingly, the environment module 114 may return the display of the application to the selection state as shown in FIG. 2.

Other regions may also be defined for implementation as part of the display environment. For example, a discard 506 region may be defined along another edge of the display environment, e.g., the left edge in the illustrated example. Movement of the display of the application in the selected state to the discard 506 region may cause the environment module 114 to exit the selection mode, e.g., to return to a state in the display environment as was achieved before the selection in FIG. 2.

In another example, snap 508 regions may be defined to "dock" a display of an application along an edge of the display environment. As described and shown in relation to FIG. 1, for instance, an immersive environment may support a concurrent display of data 116, 118 from applications that is separated by a gutter 120 that is configured to adjust an amount of display area of the display device 112 that is consumed by the respective applications. In a further example, a switch region may be defined, such as to move an application from a snap 508 region in a selected state to the switch 510 region. A variety of other examples are also contemplated. The close techniques may also be implemented to support these different views of the applications, such as for a docked application as described in relation to the following figure.

Figure 6:
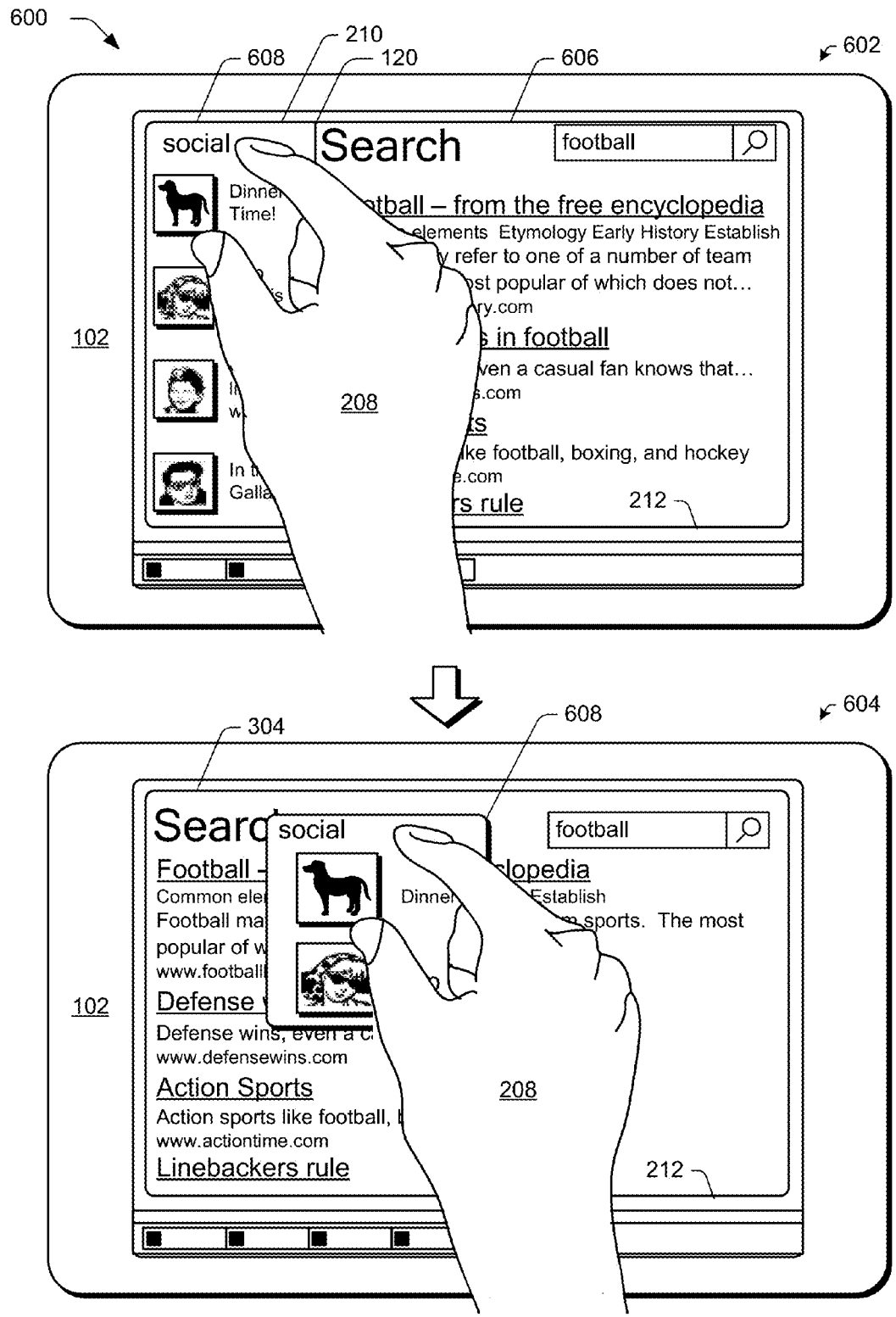
FIG. 6 depicts a system in an example implementation in which an application closing technique is applied to a docked application.

FIG. 6 depicts a system 600 in an example implementation in which an application closing technique is applied to a docked application. This system 600 is illustrated through use of first and second stages 602, 604. At the first stage 602, a user interface displayed by the display device 112 includes a first region and second region separated by a gutter 120. The first region in this example includes a primary display by the display device 112 and the second region in this example includes a "docked" application as described previously.

The first and second regions are illustrated as rendering data from a search service 606 (e.g., via a browser application) and a social network application 608, respectively. A finger of the user's hand 208 is illustrated as selecting the display of the social network application 608 from the docked region, such as by interacting with a top edge 210 of the display environment that coincides with the display of the social network application in the second region.

Responsive to subsequent movement of a point of contact away from the top edge 210 and toward the opposing bottom edge 212 of the display environment, the display characteristics of the application may change as shown in the second stage 604. Further, the display of the application in the first region (e.g., the search application 606) may be adjusted to consume a background "behind" the display of the social application, e.g., as an application in an immersive environment.

As before, the display of the application may be configured to follow subsequent movement of the finger of the user's hand 208. The user may then manipulate this display toward a close region 502 for output of an indication that a close operation is available, to initiate the close operation, and so on as described in relation to FIGS. 3-5. Other examples are also contemplated, at least one of which is described in relation to the following figure.

Figure 7:
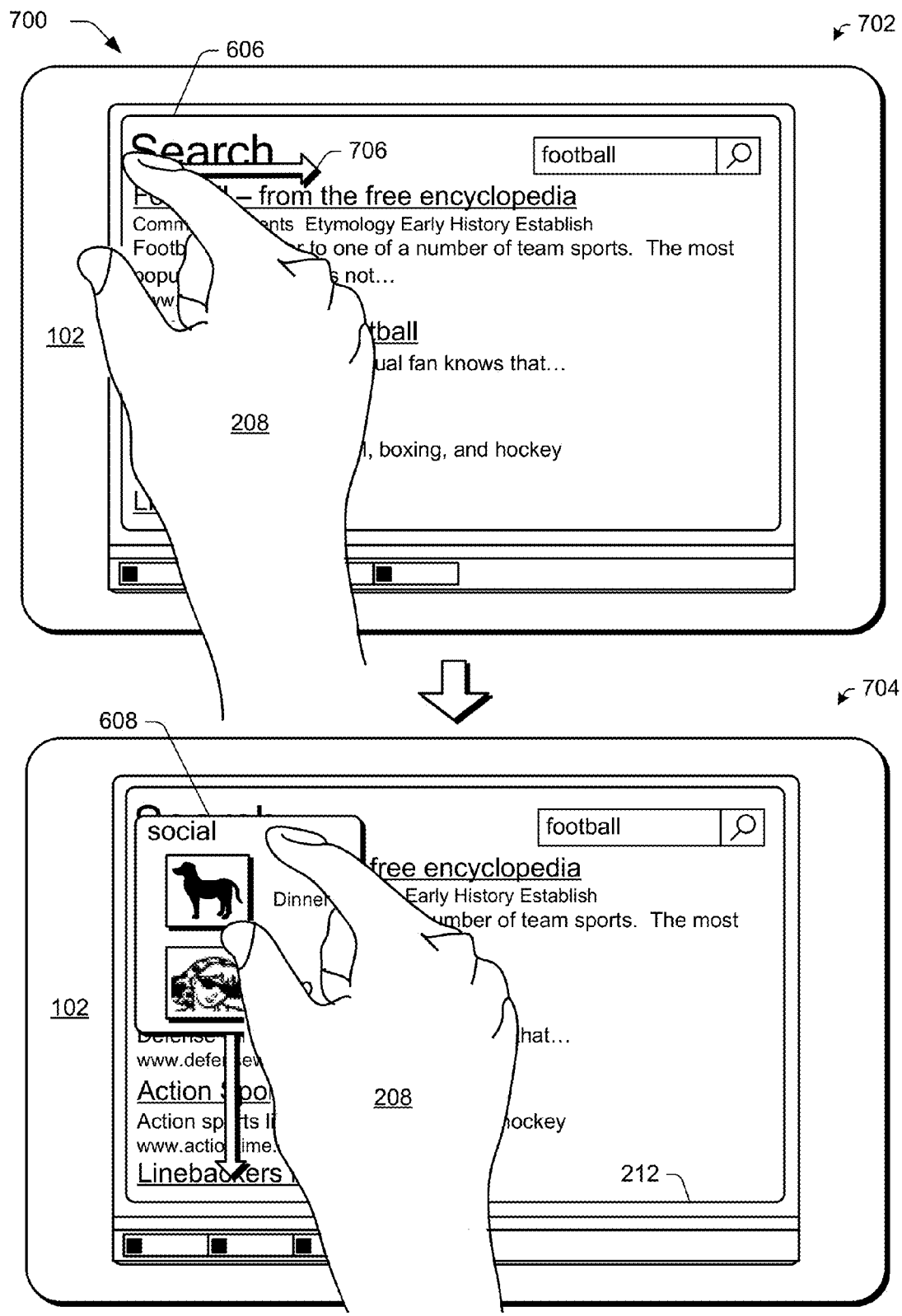
FIG. 7 depicts a system in an example implementation in which close techniques are used to close an application that is available via a back stack maintained by the operating system.

FIG. 7 depicts a system 700 in an example implementation in which the close techniques are used to close an application that is available via a back stack maintained by the operating system 108. This system 700 is shown through use of first and second stages 702, 704. As previously described, the operating system 108 may maintain an immersive environment in which a display of one or more applications may substantially consume a display environment of one or more display devices. However, applications may also "remain available" by the operating system 108 through use of a back stack in which execution of the application is suspended until it appears on the display device 112. A user, for instance, may make a swipe gesture through one or more fingers of the users hand, a "click and drag" gesture, and so on to replace one or more of the applications currently being displayed with an application from the back stack.

The close techniques described herein may also be used to close applications from the back stack. Further, these techniques may also be used without executing the application, thereby conserving resources of the computing device 102. For example, as shown at the first stage 702, a finger of the user's hand 208 is indicated as being placed proximal to a left edge of a display environment and moved away from the edge through use of an arrow 706.

In response, the environment module 114 may output a display of a "next available" application from the back stack, such as when the back stack is configured for navigation similar to a carousel. The next available application in this example is a display of the social network application 608 and is displayed as in a selection mode as previously described to follow subsequent movement of a point of selection. The selection mode may be used to support a variety of functionality as previously described, such as to specify "where" the display of the application is to be performed in the display environment, such as in the snap 508 or switch 510 regions described in relation to FIG. 5.

This selection may also be used to close the application and therefore remove it as available via the back stack. For example, subsequent movement of a point of selection may be made toward a bottom edge 212 of the display environment (as illustrated by an arrow in this example) to close the application as described in relation to FIGS. 3-5. In this way, a user may "clean up" a back stack to lessen a number of applications that are made available via scrolling. As before, this mode may also be exited through moving back to the discard 506 region and so on as previously described.

Figure 8:
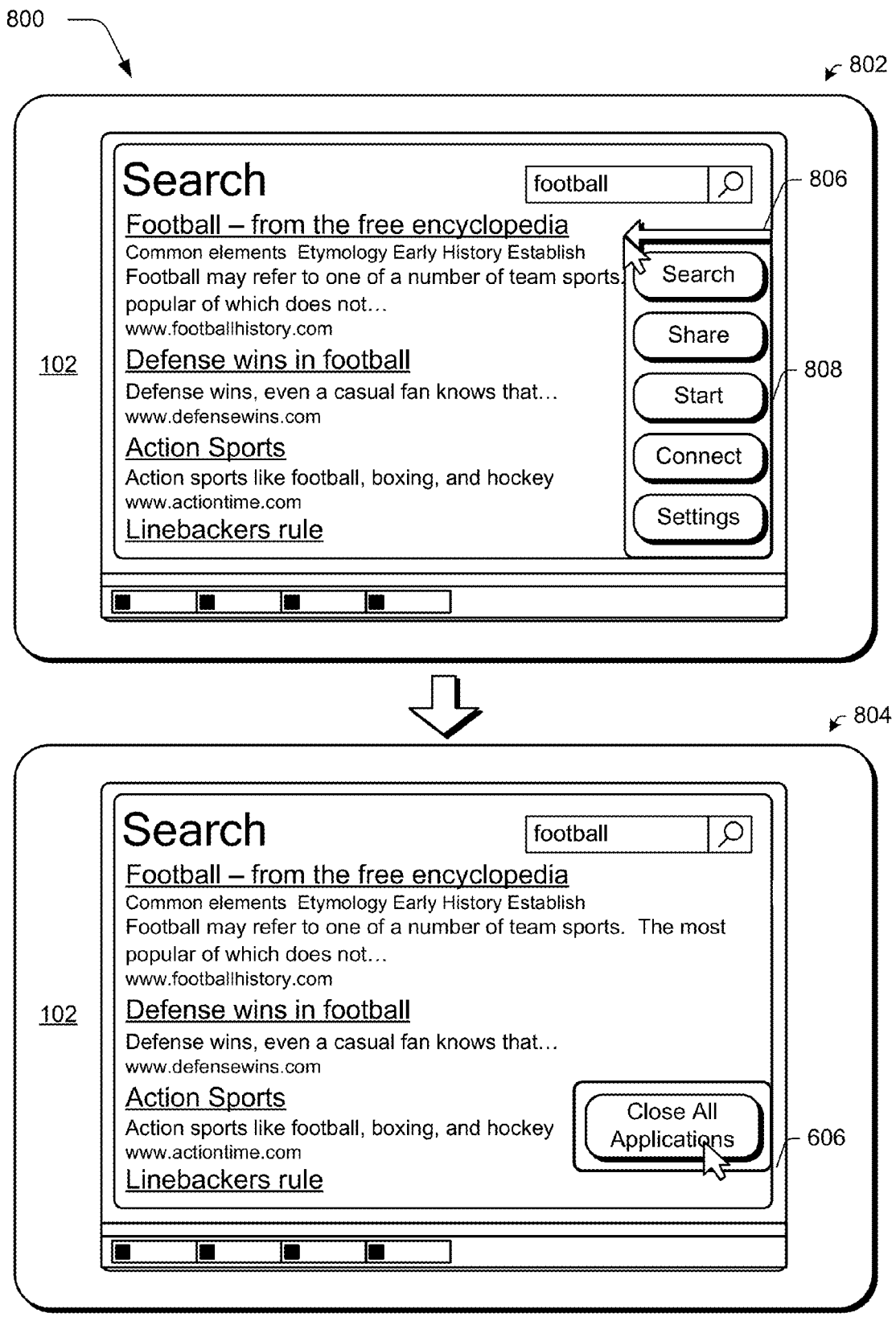
FIG. 8 depicts a system in an example implementation in which a "close all" operation is supported by an operating system of the computing device.

FIG. 8 depicts a system 800 in an example implementation in which a "close all" operation is supported by an operating system 108 of the computing device 102. This system 800 is also illustrated through use of first and second stages 802, 804. At the first stage 802, a cursor is shown as selecting a point near an edge of a display environment and including subsequent movement away from that edge, as shown through use of an arrow 806. Responsive to this movement, a menu 808 is output by the environment module 114.

The menu 808 in this example includes representations of commands that may be initiated from both the applications 110 and/or the environments supported by the environment module 114. Examples of such commands are illustrated as including "search," "share," "start," "connect," and "settings."

In this example, selection of the "settings" command at the first stage 802 causes output of another command that is selected to close all applications 810 as shown in the second stage 804. Selection of the close all applications 810 command may cause removal of an ability to execute each of the applications 110 by the computing device 102 without re-launching (as opposed to restoring) the applications 110. For example, the application may be removed from both a current display as well as a back stack supported by the operating system 108. A variety of other examples are also contemplated.

Example Procedures

The following discussion describes application closing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and systems 200-800 of FIGS. 2-8, respectively.

Figure 9:
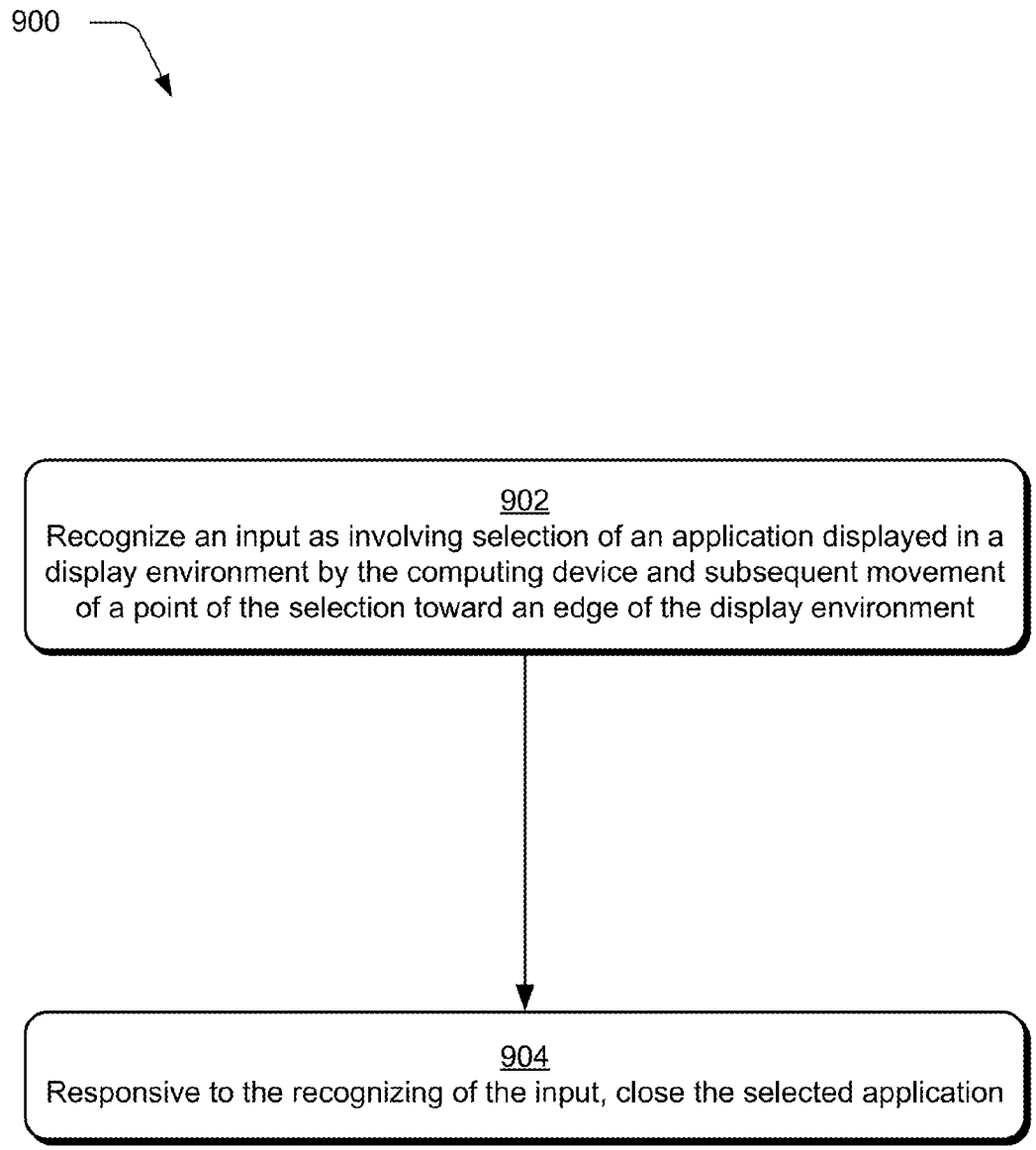
FIG. 9 is a flow diagram depicting a procedure in an example implementation in which one or more inputs are recognized as indicating initiation of a closing operation.

FIG. 9 depicts a procedure 900 in an example implementation in which one or more inputs are recognized as indicating initiation of a closing operation. A computing device recognizes an input as involving selection of an application displayed in a display environment by the computing device and subsequent movement of a point of the selection toward an edge of the display environment (block 902). The input, for instance, may be received via a cursor control device, through touchscreen functionality of a display device 112, detected using one or more cameras such as through a natural user interface, and so on. As previously described, although movement toward a bottom edge 212 was discussed, a variety of different edges of a display environment may be utilized. Additionally, the display environment may be supported by one or more display devices and thus is not limited to a physical edge nor a single display device.

Responsive to the recognizing of the input, the selected application is closed by the computing device (block 904). The operating system 108, for instance, may remove the application 110 from volatile memory, e.g., RAM, removed from storage as part of state maintained by the operating system 108 such that the application 110 is not available without "re-launching" the application 110 (e.g., as part of a back stack), and so forth.

Figure 10:
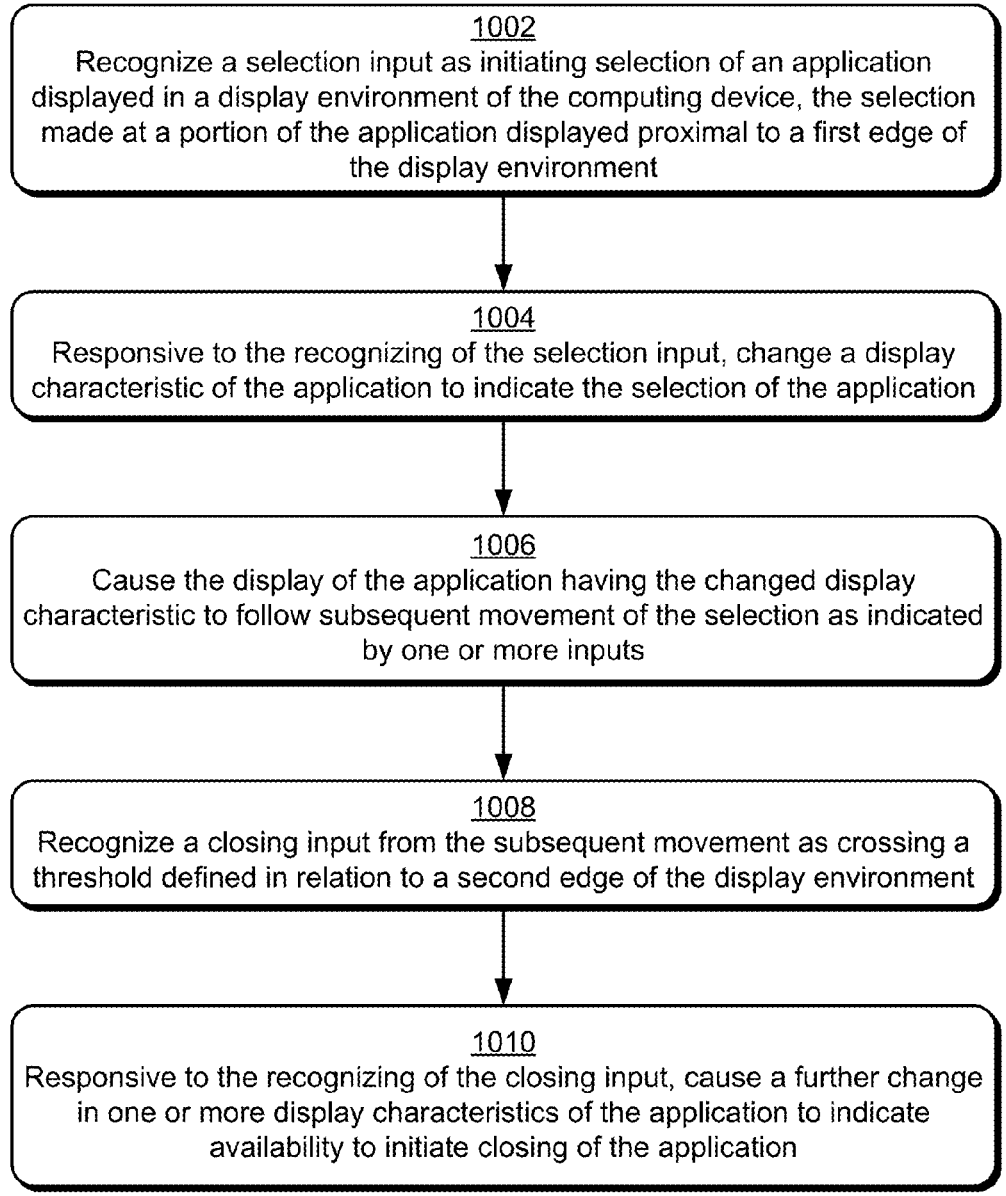
FIG. 10 is a flow diagram depicting a procedure in an example implementation in which display characteristics are changed to indicate selection and availability of a close operation to close an application.

FIG. 10 depicts a procedure 1000 in an example implementation in which display characteristics are changed to indicate selection and availability of a close operation to close an application. A computing device recognizes a selection input as initiating selection of an application displayed in a display environment of the computing device, the selection made at a portion of the application displayed proximal to at a first edge of the display environment (block 1002). The selection, for instance, may involve contact detected using touchscreen functionality of the display device 112 (e.g., a finger or stylus press), a click and hold made by a cursor control device, and so forth.

Responsive to the recognition of the selection input, a display characteristic of the application is changed to indicate the selection of the application (block 1004). The environment module 114, for instance, may change a size, transparency, and so on of the display of the application in the user interface.

The display of the application having the changed display characteristic is also caused to follow subsequent movement of the selection as indicated by one or more inputs (block 1006). Continuing with the previous example, the subsequent movement may follow subsequent movement defined by a cursor control device while "clicked," subsequent movement of a contact as continued across a display device 112 using touchscreen functionality, and so forth.

A closing input is recognized through the subsequent movement as crossing a threshold defined in relation to a second edge of the display environment (block 1008). The closing input, for instance, may be detected by crossing a static threshold (e.g., a threshold defined at a particular location in a display environment for a touch contact), a dynamic threshold (e.g., defined as an amount of movement in relation to a display environment, such as for a cursor control device), and so forth.

Responsive to the recognizing of the closing input, a further change in one or more display characteristics of the application is caused to indicate availability to initiate closing of the application (block 1010). The environment module 114, for instance, may cause the change (e.g., a further reduction in size, increase in transparency, and so forth) to indicate when the close operation is available. A user may then lift a button of a cursor control device, remove a finger of the user's hand 208 from contacted the display device 112, and so on to initiate the operation, further discussion of which may be found in relation to the following figure.

FIG. 11 depicts a procedure 1100 in an example implementation in which a mode is entered that is usable to close one or more applications. A computing device enters a mode to close an application responsive to recognition of one or more inputs to select an application displayed in a display environment by the computing device, the mode operable to change a display characteristic of the application and cause the display of the application to follow subsequent movement described by an input device used to select the application as defined by the inputs (block 1102). A user, for instance, may enter the mode by contacting a display of an application on a display device 112 near a top edge 210 of the device, although other edges and locations in the display environment are also contemplated. As previously described, a cursor control device may also be used.

The computing device exits the mode to close the application responsive to detection that the one or more inputs have ceased (block 1104). The user as shown in FIG. 4, for instance, may remove a finger of the user's hand from the display device 112 while the display of the application 206 is positioned within the close region 502 of the display environment, thereby causing initiation of the close operation and exit of the mode. Other examples are also contemplated, such as through positioned of a point of the selection in the discard 506 region, snap 508 regions, switch 510 regions, and so on.

Example System and Device

Figure 12:
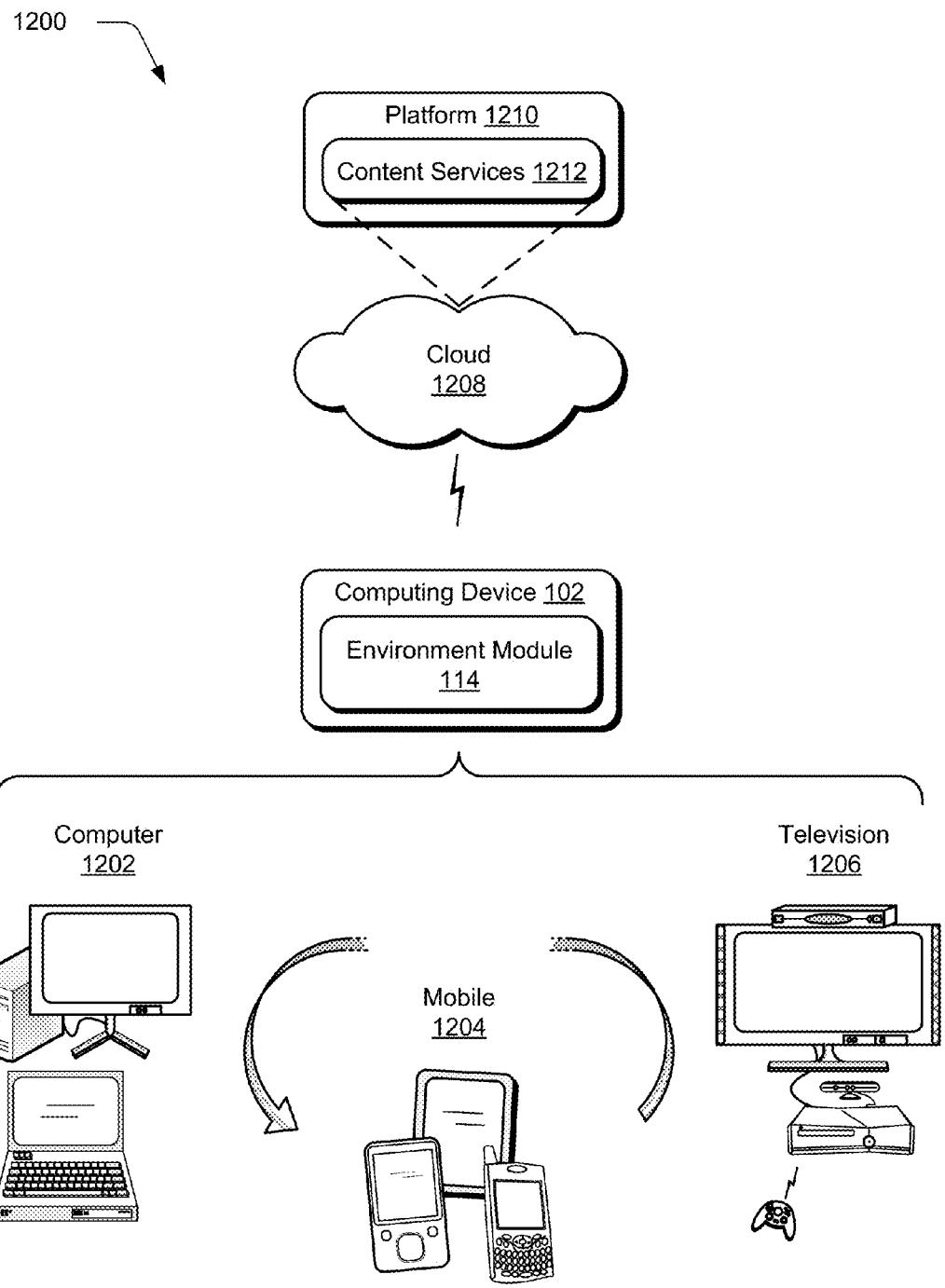
FIG. 12 illustrates an example system that includes the computing device as described with reference to FIG. 1.

FIG. 12 illustrates an example system 1200 that includes the computing device 102 as described with reference to FIG. 1. The example system 1200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 1202, mobile 1204, and television 1206 uses. Each of these configurations includes devices that may have generally different constructs and capabilities, and thus the computing device 102 may be configured according to one or more of the different device classes. For instance, the computing device 102 may be implemented as the computer 1202 class of a device that includes a personal computer, desktop computer, a multi-screen computer, laptop computer, netbook, and so on.

The computing device 102 may also be implemented as the mobile 1204 class of device that includes mobile devices, such as a mobile phone, portable music player, portable gaming device, a tablet computer, a multi-screen computer, and so on. The computing device 102 may also be implemented as the television 1206 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 1208 includes and/or is representative of a platform 1210 for content services 1212. The platform 1210 abstracts underlying functionality of hardware (e.g., servers) and software resources of the cloud 1208. The content services 1212 may include applications and/or data that can be utilized while computer processing is executed on servers that are remote from the computing device 102. Content services 1212 can be provided as a service over the Internet and/or through a subscriber network, such as a cellular or Wi-Fi network.

The platform 1210 may abstract resources and functions to connect the computing device 102 with other computing devices. The platform 1210 may also serve to abstract scaling of resources to provide a corresponding level of scale to encountered demand for the content services 1212 that are implemented via the platform 1210. Accordingly, in an interconnected device embodiment, implementation of functionality of the functionality described herein may be distributed throughout the system 1200. For example, the functionality may be implemented in part on the computing device 102 as well as via the platform 1210 that abstracts the functionality of the cloud 1208.

Figure 13:
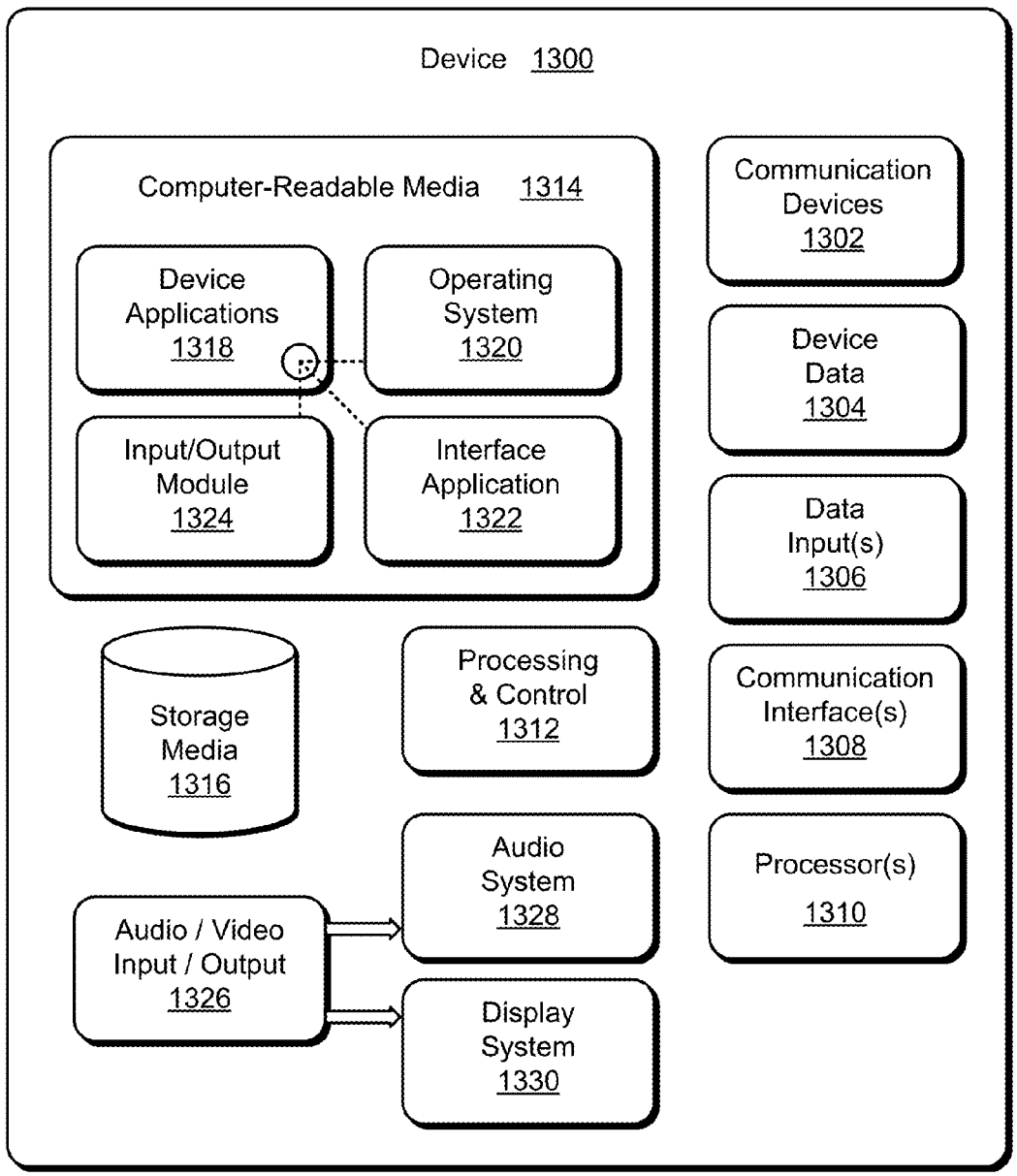
FIG. 13 illustrates various components of an example device that can be implemented as any type of computing device as described with reference to FIGS. 1-8 and 12 to implement embodiments of the techniques described herein.

FIG. 13 illustrates various components of an example device 1300 that can be implemented as any type of computing device as described with reference to FIGS. 1, 2, and 12 to implement embodiments of the techniques described herein. Device 1300 includes communication devices 1302 that enable wired and/or wireless communication of device data 1304 (e.g., received data, data that is being received, data scheduled for broadcast, data packets of the data, etc.). The device data 1304 or other device content can include configuration settings of the device, media content stored on the device, and/or information associated with a user of the device. Media content stored on device 1300 can include any type of audio, video, and/or image data. Device 1300 includes one or more data inputs 1306 via which any type of data, media content, and/or inputs can be received, such as user-selectable inputs, messages, music, television media content, recorded video content, and any other type of audio, video, and/or image data received from any content and/or data source.

Device 1300 also includes communication interfaces 1308 that can be implemented as any one or more of a serial and/or parallel interface, a wireless interface, any type of network interface, a modem, and as any other type of communication interface. The communication interfaces 1308 provide a connection and/or communication links between device 1300 and a communication network by which other electronic, computing, and communication devices communicate data with device 1300.

Device 1300 includes one or more processors 1310 (e.g., any of microprocessors, controllers, and the like) which process various computer-executable instructions to control the operation of device 1300 and to implement embodiments of the techniques described herein. Alternatively or in addition, device 1300 can be implemented with any one or combination of hardware, firmware, or fixed logic circuitry that is implemented in connection with processing and control circuits which are generally identified at 1312. Although not shown, device 1300 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1300 also includes computer-readable media 1314, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1300 can also include a mass storage media device 1316.

Computer-readable media 1314 provides data storage mechanisms to store the device data 1304, as well as various device applications 1318 and any other types of information and/or data related to operational aspects of device 1300. For example, an operating system 1320 can be maintained as a computer application with the computer-readable media 1314 and executed on processors 1310. The device applications 1318 can include a device manager (e.g., a control application, software application, signal processing and control module, code that is native to a particular device, a hardware abstraction layer for a particular device, etc.). The device applications 1318 also include any system components or modules to implement embodiments of the techniques described herein. In this example, the device applications 1318 include an interface application 1322 and an input/output module 1324 that are shown as software modules and/or computer applications. The input/output module 1324 is representative of software that is used to provide an interface with a device configured to capture inputs, such as a touchscreen, track pad, camera, microphone, and so on. Alternatively or in addition, the interface application 1322 and the input/output module 1324 can be implemented as hardware, software, firmware, or any combination thereof. Additionally, the input/output module 1324 may be configured to support multiple input devices, such as separate devices to capture visual and audio inputs, respectively.

Device 1300 also includes an audio and/or video input-output system 1326 that provides audio data to an audio system 1328 and/or provides video data to a display system 1330. The audio system 1328 and/or the display system 1330 can include any devices that process, display, and/or otherwise render audio, video, and image data. Video signals and audio signals can be communicated from device 1300 to an audio device and/or to a display device via an RF (radio frequency) link, S-video link, composite video link, component video link, DVI (digital video interface), analog audio connection, or other similar communication link. In an embodiment, the audio system 1328 and/or the display system 1330 are implemented as external components to device 1300. Alternatively, the audio system 1328 and/or the display system 1330 are implemented as integrated components of example device 1300.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   recognizing an input as involving selection of a portion of an application displayed in a display environment by the computing device and subsequent movement of a point of the selection toward a first edge of the display environment, the selected portion of the application positioned at a second edge of the display environment that is opposite the first edge, the display environment including a plurality of regions associated with different actions of the application, at least one of the regions defined by the first edge of the display device and involving closing of the application and defined by a dynamic threshold that is determined from the subsequent movement of the point of the selection toward the first edge of the display environment, the dynamic threshold defined as a percentage of the subsequent movement between the second and first edges of the display environment, at least another region other than the at least one of the regions configured such that moving the selected application into the another region causes the selection of the application not to be recognized; and
   responsive to the recognizing of the input, closing the selected application.

2. A method as described in claim 1, wherein the input is recognized from one or more inputs received via touchscreen functionality or a cursor control device of the computing device.

3. A method as described in claim 1, wherein the closing includes sending one or more events to the application that indicate that the application is to be closed.

4. A method as described in claim 1, further comprising responsive to recognition that a portion of the application has been selected, changing a display characteristic of the selected application to indicate that the application has been selected.

5. A method as described in claim 4, wherein the changing of the display characteristic includes changing an amount of area of the display environment used to display the application or changing a transparency of the application as displayed on the display environment.

6. A method as described in claim 1, wherein the subsequent movement is recognized as passing a threshold.

7. A method as described in claim 6, further comprising responsive to recognition that the movement has passed the threshold, changing a display characteristic of the selected application to indicate that the closing of the application is available upon ceasing of the input.

8. A method as described in claim 6, wherein the threshold is defined as occurring at a set physical distance from the edge of the display environment.

9. A method as described in claim 6, wherein the threshold is defined as a defined proportion of an available display area of the display environment from the edge.

10. A method as described in claim 6, further comprising keeping the application open responsive to recognition that the input describes movement that has exited a region defined by the threshold.

11. A method as described in claim 1, wherein the recognizing includes recognizing the subsequent movement as occurring at a velocity that is indicative of a user's desire to close the application.

12. A method as described in claim 1, wherein the application is maintained in a back stack of the computing device and the closing of the application is performed without actively executing the application.

13. A method as described in claim 1, wherein the closing includes display of an animation that is indicative that the closing of the application is to be performed.

14. A method as described in claim 1, wherein the selection and the subsequent movement involve a gesture that includes detection of contact, using touchscreen functionality of the display environment, of a portion of the application displayed by the display environment and the subsequent movement involving continuation of the contact toward the first edge and the input further describes cessation of the contact, thereby completing the gesture.

15. A method implemented by a computing device, the method comprising:
- recognizing a selection input as initiating selection of an application displayed in a display environment of the computing device, the selection made at a portion of the application displayed proximal to a first edge of the display environment, the display environment including a plurality of regions associated with different actions of the application, at least one of the regions defined by a second edge of the display device and involving closing of the application;
- responsive to the recognizing of the selection input, changing a display characteristic of the application to indicate the selection of the application;
- causing the display of the application having the changed display characteristic to follow subsequent movement of the selection, the at least one of the regions of the display environment defined by a dynamic threshold that is determined from the subsequent movement of the selection, the dynamic threshold defined as a percentage of the subsequent movement between the first and second edges of the display environment;
- recognizing a closing input from the subsequent movement as crossing a threshold defined in relation to the second edge of the display environment; and
- responsive to the recognizing of the closing input, causing a further change in one or more display characteristics of the application to indicate availability to initiate closing of the applications.

16. A method as described in claim 15, wherein the first and second edges of the display environment define opposing sides of the display environment.

17. A method implemented by a computing device, the method comprising:
- entering a mode to close an application responsive to recognition of one or more inputs to select an application displayed in a display environment by the computing device, the selection made at a portion of the application displayed proximal to a first edge of the display environment and selection of the application causing a background of the display environment to be exposed that was not exposed prior to the selection of the application, the mode operable to change a display characteristic of the application and cause the display of the application to follow subsequent movement described by an input device used to select the application as defined by the inputs, the subsequent movement toward a second edge of the display environment that is opposite the first edge, the display environment including a plurality of regions associated with different actions of the application, at least one of the regions defined by the second edge of the display device and involving closing of the application, the at least one of the regions further defined by a dynamic threshold that is determined from the subsequent movement, the dynamic threshold defined as a percentage of the subsequent movement between the first and second edges of the display environment, at least another region other than the at least one of the regions configured such that moving the selected application into the another region causes the selection of the application not to be recognized; and
- exiting the mode to close the application responsive to detection that the one or more inputs have ceased.

18. A method as described in claim 17, wherein the input device is a cursor control device.

19. A method as described in claim 17, wherein:
- the input device involves touchscreen functionality of one or more display devices used to implemented the display environment;
- the entering of the mode is performed responsive to detection of contact by the touchscreen functionality; and
- the exiting of the mode is performed responsive to removal of the contact as detected by the touchscreen functionality.

* * * * *